US011610478B2

(12) United States Patent
Kalkunte et al.

(10) Patent No.: US 11,610,478 B2
(45) Date of Patent: Mar. 21, 2023

(54) COMMUNICATION SYSTEM AND METHOD FOR CONTROLLING COOPERATION BETWEEN EDGE DEVICES ARRANGED IN VEHICLE

(71) Applicant: PELTBEAM INC., Saratoga, CA (US)

(72) Inventors: Venkat Kalkunte, Saratoga, CA (US); Mehdi Hatamian, Mission Viejo, CA (US); Arman Rofougaran, Newport Coast, CA (US); Puya Rofougaran, Irvine, CA (US)

(73) Assignee: PELTBEAM INC., Saratoga, CA (US)

( * ) Notice: Subject to any disclaimer, the term of this patent is extended or adjusted under 35 U.S.C. 154(b) by 0 days.

(21) Appl. No.: 17/646,542

(22) Filed: Dec. 30, 2021

(65) Prior Publication Data

US 2023/0039386 A1 Feb. 9, 2023

Related U.S. Application Data

(60) Provisional application No. 63/260,104, filed on Aug. 9, 2021.

(51) Int. Cl.
*G08G 1/01* (2006.01)
*H04W 4/40* (2018.01)
*H04W 84/18* (2009.01)

(52) U.S. Cl.
CPC ......... *G08G 1/0116* (2013.01); *G08G 1/0133* (2013.01); *G08G 1/0145* (2013.01); *H04W 4/40* (2018.02); *H04W 84/18* (2013.01)

(58) Field of Classification Search
CPC .. G08G 1/0116; G08G 1/0133; G08G 1/0145; H04W 4/40; H04W 84/18
See application file for complete search history.

(56) References Cited

U.S. PATENT DOCUMENTS

| | | | | |
|---|---|---|---|---|
| 8,675,667 | B1 * | 3/2014 | DeMartino | H04L 12/42 370/400 |
| 9,830,813 | B2 * | 11/2017 | Smith | G08G 1/0145 |
| 9,871,819 | B2 * | 1/2018 | Liyanage | H04L 63/0428 |
| 10,171,499 | B2 * | 1/2019 | Kumar | H04L 67/12 |
| 10,977,936 | B2 * | 4/2021 | Zhang | G08G 1/081 |
| 11,115,872 | B2 * | 9/2021 | Dowlatkhah | H04W 36/26 |
| 11,138,035 | B1 * | 10/2021 | Parulkar | G06F 9/45558 |
| 11,146,455 | B2 * | 10/2021 | Doshi | H04L 67/10 |
| 11,159,958 | B1 * | 10/2021 | Hatamian | H04W 74/0808 |
| 11,172,542 | B1 * | 11/2021 | Kalkunte | H04W 88/04 |

(Continued)

*Primary Examiner* — Luis A Martinez Borrero
(74) *Attorney, Agent, or Firm* — Chip Law Group

(57) ABSTRACT

A communication system includes a central cloud server that detects the presence of an active sync path at each of a first edge device and a second edge device, where the first edge device is arranged at a first location at a vehicle and the second edge device is arranged at a second location of the vehicle. The central cloud server further determines a dominant edge device and a non-dominant edge device from the first edge device and the second edge device. The central cloud server further elects the determined dominant edge device from the first edge device and the second edge device to service one or more user equipment (UEs) in the vehicle, which improves performance in terms of data throughput and signal-to-noise ratio (SNR) of one or more UEs present in the vehicle by effectively controlling cooperation between two edge devices arranged in the vehicle.

19 Claims, 9 Drawing Sheets

(56) References Cited

U.S. PATENT DOCUMENTS

| | | | |
|---|---|---|---|
| 11,191,013 B1* | 11/2021 | Kalkunte | H04W 72/0453 |
| 11,265,733 B1* | 3/2022 | Hatamian | H04W 74/0808 |
| 2016/0143070 A1* | 5/2016 | Liyanage | H04L 63/0428 |
| | | | 370/329 |
| 2017/0126836 A1* | 5/2017 | Krishna | G06F 16/9535 |
| 2017/0289824 A1* | 10/2017 | Figoli | H04W 60/00 |
| 2019/0208449 A1* | 7/2019 | Wang | H04W 36/32 |
| 2019/0333375 A1* | 10/2019 | Malkes | G01W 1/10 |
| 2019/0335371 A1* | 10/2019 | Shen | H04W 36/04 |
| 2020/0036644 A1* | 1/2020 | Belogolovy | H04L 1/0014 |
| 2020/0136920 A1* | 4/2020 | Doshi | H04L 67/10 |
| 2020/0169857 A1* | 5/2020 | Yang | H04L 43/0858 |
| 2020/0177671 A1* | 6/2020 | Tofighbakhsh | H04L 67/12 |
| 2020/0196155 A1* | 6/2020 | Bogineni | H04L 41/0823 |
| 2020/0196235 A1* | 6/2020 | Synnergren | H04W 52/0229 |
| 2020/0225655 A1* | 7/2020 | Cella | G05B 23/024 |
| 2020/0257310 A1* | 8/2020 | Du | G05D 1/0285 |
| 2020/0275402 A1* | 8/2020 | Shi | G01S 5/0278 |
| 2020/0314614 A1* | 10/2020 | Moustafa | H04L 67/34 |
| 2020/0334978 A1* | 10/2020 | Pittman | H04L 47/821 |
| 2020/0348662 A1* | 11/2020 | Cella | G06N 3/088 |
| 2020/0351380 A1* | 11/2020 | Fedorov | H04W 4/70 |
| 2021/0036752 A1* | 2/2021 | Tofighbakhsh | H04B 7/0695 |
| 2021/0099848 A1* | 4/2021 | Ruan | H04W 4/44 |
| 2021/0134152 A1* | 5/2021 | Huang | G08G 1/083 |
| 2021/0144517 A1* | 5/2021 | Guim Bernat | H04L 9/0637 |
| 2021/0157312 A1* | 5/2021 | Cella | G05B 23/0286 |
| 2021/0168662 A1* | 6/2021 | Dowlatkhah | H04W 36/0022 |
| 2021/0208992 A1* | 7/2021 | Vega | G06F 9/5088 |
| 2021/0286072 A1* | 9/2021 | Mende | G08G 1/052 |
| 2021/0374414 A1* | 12/2021 | Wilkosz | G08B 13/19621 |
| 2021/0385865 A1* | 12/2021 | Mueck | H04W 74/006 |
| 2021/0392510 A1* | 12/2021 | Cui | H04W 16/26 |
| 2021/0409335 A1* | 12/2021 | Zhu | H04L 47/24 |
| 2022/0013008 A1* | 1/2022 | Katz | G08G 1/087 |

\* cited by examiner

COMMUNICATION SYSTEM AND METHOD FOR CONTROLLING COOPERATION BETWEEN EDGE DEVICES ARRANGED IN VEHICLE

CROSS-REFERENCE TO RELATED APPLICATIONS/INCORPORATION BY REFERENCE

This Application makes reference to, claims priority to, and claims benefit from U.S. Provisional Application Ser. No. 63/260,104 filed on Aug. 9, 2021.

The above-referenced Application is hereby incorporated herein by reference in its entirety.

FIELD OF TECHNOLOGY

Certain embodiments of the disclosure relate to a wireless communication system. More specifically, certain embodiments of the disclosure relate to a communication system and a method for controlling cooperation between edge devices (e.g., between two repeaters) arranged in a vehicle for high-performance communication in mobility applications.

BACKGROUND

Wireless telecommunication in modern times has witnessed the advent of various signal transmission techniques and methods, such as beamforming and beam steering techniques, for enhancing the capacity of radio channels. Latency and high volume of data processing are considered prominent issues with next-generation networks, such as 5G. Currently, the use of edge computing in next-generation networks, such as 5G, beyond 5G, and upcoming 6G, is an active area of research, and many benefits have been proposed, for example, faster communication between vehicles, pedestrians, and infrastructure, and other communication devices. For example, it is proposed that close proximity of conventional edge devices to user equipment (UEs) may likely reduce the response delay usually suffered by UEs while accessing the traditional cloud. However, there are many open technical challenges for successful and practical use of edge computing in the next generation networks, especially in 5G or the upcoming 6G environment.

In a first example, currently, performance in terms of data throughput, signal to noise ratio, and latency may be adversely affected for mobile systems, such as the UEs, present in a moving vehicle. Moreover, it is observed that batteries of UEs (e.g., smartphones) drains faster when the UEs are switched back and forth from the 4G to 5G radio access. In mobility scenarios, for example, when such UEs are present in the moving vehicle, the batteries of such UEs drains even faster, which is not desirable. Furthermore, there is high battery consumption during the standard initial access search (e.g., when the standard beam sweeping operation is used in the initial access phase).

In a second example, Quality of experience (QoE) is another open issue, which is a measure of a user's holistic satisfaction level with a service provider (e.g., Internet access, phone call, or other carrier network-enabled services). The challenge is how to ensure seamless connectivity as well as QoE without significantly increasing infrastructure costs.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A communication system and a method for controlling cooperation between edge devices arranged in a vehicle for high-performance communication in mobility applications, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a communication system and a method for controlling cooperation between edge devices arranged in a vehicle for high-performance communication in mobility applications. The communication system and the method of the present disclosure ensure seamless connectivity as well as Quality of Experience (QoE). The communication system and the method of the present disclosure significantly improve performance in terms of data throughput and signal-to-noise ratio (SNR) of one or more UEs present in a vehicle by effectively controlling cooperation between two edge devices arranged in the vehicle. The communication system comprises a central cloud server, which upon discovering that both the edge devices (i.e., both the repeater #1 and repeater #2) have the active synch path, is able to elect the edge device that is dominant in terms of Reference Signal Received Power (RSRP) and the SNR and may purposefully enfeeble the non-dominant edge device (e.g., weaken its Tx power) that was acting as the noise source. The one or more UEs may then be connected to the dominant edge device, which is observed to significantly improve the performance of one or more UEs. Furthermore, the communication system and the method of the present disclosure reduce the battery consumption of one or more UEs when such one or more UEs are connected to the dominant edge device. In the following description, reference is made to the accompanying drawings, which form a part hereof, and in which is shown, by way of illustration, various embodiments of the present disclosure.

Figure 1:
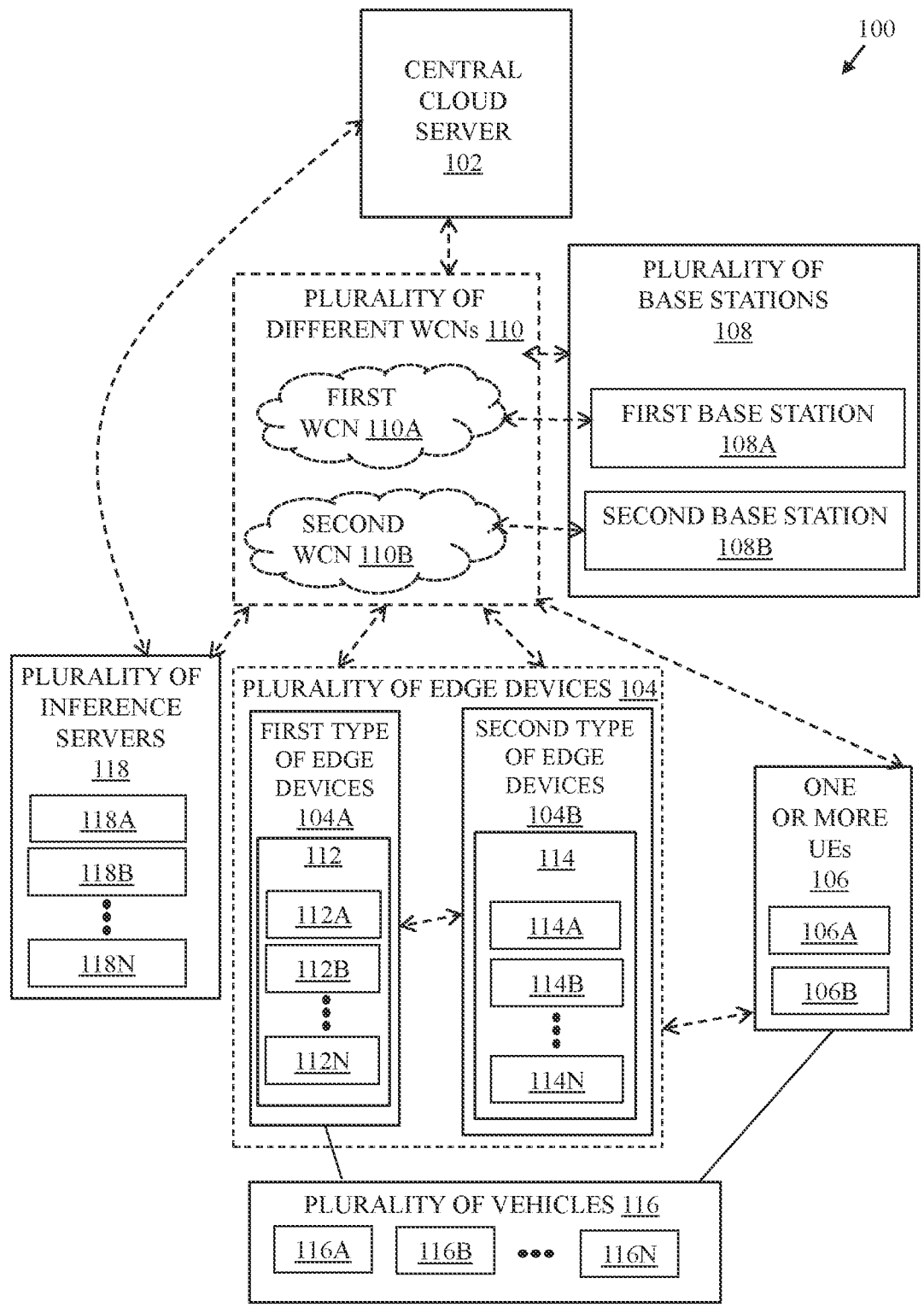
FIG. 1 is a network environment diagram illustrating various components of an exemplary communication system, in accordance with an exemplary embodiment of the disclosure.

FIG. 1 is a network environment diagram illustrating various components of an exemplary communication system, in accordance with an exemplary embodiment of the disclosure. With reference to FIG. 1, there is shown a network environment diagram of a communication system 100 that includes a central cloud server 102 and a plurality of edge devices 104. In the network environment diagram, there is further shown one or more user equipment (UEs) 106, a plurality of base stations 108, and a plurality of different wireless carrier networks (WCNs) 110, such as a first WCN 110A of a first service provider and a second WCN 110B of a second service provider. The plurality of edge devices 104 may include a first type of edge devices 104A and a second type of edge devices 104B. The first type of edge devices 104A may be edge devices that are movable, for example, one or more edge devices (e.g., a first edge device 112A and a second edge device 112B) arranged at each vehicle of a plurality of vehicles 116. The second type of edge devices 104B, may be the edge devices that are immobile and deployed at different locations, such as a plurality of RSU devices 114. The communication system 100 may further include a plurality of inference servers 118 (such as inference servers 118A, 118B, . . . , 118N) that may be communicatively coupled to the central cloud server 102 via an out-of-band communication network 120 and/or one or more in-band communication networks associated with the plurality of different WCNs 110.

The central cloud server 102 includes suitable logic, circuitry, and interfaces that may be configured to communicate with the plurality of edge devices 104, the one or more UEs 106, the plurality of base stations 108, the plurality of vehicles 116, and the plurality of inference servers 118. In an example, the central cloud server 102 may be a remote management server that is managed by a third party different from the service providers associated with the plurality of different WCNs 110. In another example, the central cloud server 102 may be a remote management server or a data center that is managed by a third party, or jointly managed, or managed in coordination and association with one or more of the plurality of different WCNs 110. In an implementation, the central cloud server 102 may be a master cloud server or a master machine that is a part of a data center that controls an array of other cloud servers communicatively coupled to it for load balancing, running customized applications, and efficient data management.

Each edge device of the plurality of edge devices 104 includes suitable logic, circuitry, and interfaces that may be configured to communicate with the central cloud server 102. The plurality of edge devices 104 may include the first type of edge devices 104A and the second type of edge devices 104B. The first type of edge devices 104A may be the edge devices (e.g., a first edge device 112A, a second edge device 112B, up to an Nth edge device 112N), which are movable. For example, some edge devices, such as a repeater device, may be installed in a vehicle, and thus the location of such repeater device may vary rapidly when the vehicle is in motion. In some implementations, an edge device may be a part of a telematics unit of a vehicle. In some implementations, the first type of edge devices 104A may further include UEs controlled by the central cloud server 102. In such a case, the UEs may be controlled out-of-band, for example, in a management plane, by the central cloud server 102. Such one or more edge devices that are movable and/or associated vehicles (such as the vehicles 116A, 116B, . . . , 116N) are referred to as the first type of edge devices 104A. Examples of the first type of edge devices 104A may include, but may not be limited to, an XG-enabled repeater device, an XG-enabled relay device, or an XG-enabled mobile edge communication device, where the XG corresponds to 5G or 6G communication. The second type of edge devices 104B may be edge devices that are immobile and deployed at different locations. The plurality of RSU devices 114 may be the second type of edge devices 104B. Examples of the second type of edge devices 104B may include but are not limited to, an XG-enabled repeater device, an XG-enabled small cell, an XG-enabled customer premise equipment (CPE), an XG-enabled relay device, an XG-enabled RSU device, or an XG-enabled edge communication device deployed at a fixed location.

Each of one or more UEs 106 may correspond to telecommunication hardware used by an end-user to communicate. Alternatively stated, the one or more UEs 106 may refer to a combination of mobile equipment and subscriber identity module (SIM). Each of the one or more UEs 106 may be a subscriber of at least one of the plurality of different WCNs 110. Examples of the one or more UEs 106 may include but are not limited to an XG-enabled smartphone, an in-vehicle infotainment system, or an XG-enabled in-vehicle device, a virtual reality headset, an augmented reality device, a wireless modem, any other customized hardware for telecommunication, or other vehicle device or the vehicle itself, wherein the XG corresponds to a 5G or a 6G radio access communication.

Each of the plurality of base stations 108 may be a fixed point of communication that may communicate information, in the form of a plurality of beams of RF signals, to and from communication devices, such as the one or more UEs 106 and the plurality of edge devices 104. Multiple base stations corresponding to one service provider may be geographically positioned to cover specific geographical areas. Typically, bandwidth requirements serve as a guideline for a location of a base station based on the relative distance between the plurality of UEs and the base station. The count of base stations depends on population density and geographic irregularities, such as buildings and mountain ranges, which may interfere with the plurality of beams of RF signals. In an implementation, each of the plurality of base stations 108 may be a gNB. In another implementation, the plurality of base stations 108 may include eNBs, Master eNBs (MeNBs) (for non-standalone mode), and gNBs.

Each of the plurality of different WCNs 110 is owned, managed, or associated with a mobile network operator (MNO), also referred to as a mobile carrier, a cellular company, or a wireless service provider that provides services, such as voice, SMS, MMS, Web access, data services, and the like, to its subscribers, over a licensed radio spectrum. Each of the plurality of different WCNs 110 may own or control elements of network infrastructure to provide services to its subscribers over the licensed spectrum, for example, 4G LTE, or 5G spectrum (FR1 or FR2). For example, the first base station 108A may be controlled, managed, or associated with the first WCN 110A, and the second base station 108B may be controlled, managed, or associated with the second WCN 110B, different from the first WCN 110A. The plurality of different WCNs 110 may also include mobile virtual network operators (MVNO).

Each of the plurality of vehicles 116 includes suitable logic, circuitry, and interfaces that may be configured to communicate with the central cloud server 102, for example, via the one or more edge devices arranged at each vehicle. In some implementations, one edge device, such as the first edge device 112A, may be arranged at a given vehicle, such as the vehicle 116A. In an example, the edge device may be a part of a telematics unit of the vehicle. In some implementations, two edge devices, such as the first edge device 112A and the second edge device 112B, may be arranged on some vehicles. In such a case, the first edge device 112A and the second edge device 112B may be arranged at different positions (i.e., different locations) in the vehicle. The plurality of vehicles 116 may include autonomous vehicles, semi-autonomous vehicles, and/or non-autonomous vehicles.

The plurality of inference servers 118 may be distributed at a plurality of different geographical zones such that each inference server serves a different geographical zone. Each of the plurality of inference servers 118 may be configured to obtain a subset of information from connectivity enhanced database according to a corresponding geographical zone of the plurality of different geographical zones served by each of the plurality of inference servers 118. Each of the plurality of inference servers 118 includes suitable logic, circuitry, and interfaces that may be configured to receive a real-time or a near real-time request from an edge device of the plurality of edge devices 104 within its geographical zone. In an example, the real-time or the near real-time request may comprise one or more input features corresponding to sensing information of a given vehicle. The plurality of edge devices 104 corresponds to the plurality of RSU devices 114 (i.e., the second type of edge devices 104B) and the one or more edge devices (i.e., one or more of the first type of edge devices 104A) arranged on each vehicle of the plurality of vehicles 116. Based on the received request, a given inference server, such as the inference server 118A, may be further configured to communicate a response within less than a specified threshold time to each of the one or more RSU devices, wherein the response comprises wireless connectivity enhanced information including specific initial access information to each of the one or more RSU devices to bypass the initial access-search on the one or more RSU devices as well as the first edge device of the given vehicle.

Beneficially, the central cloud server 102 and the plurality of edge devices 104 exhibit a decentralized model that not only brings cloud computing capabilities closer to UEs in order to reduce latency but also manifests several known benefits for various service providers associated with the plurality of different WCNs 110. For example, it reduces backhaul traffic by provisioning content at the edge, distributes computational resources geographically in different locations (e.g., on-premises mini cloud, central offices, customer premises, etc.,) depending on the use case requirements, and improves the reliability of a network by distributing content between edge devices and the centralized cloud server 102. Apart from these and other known benefits (or inherent properties) of edge computing, the central cloud server 102 improves and solves many open issues related to the convergence of edge computing and the next-generation wireless networks, such as 5G or upcoming 6G. The central cloud server 102 significantly improves the beam management mechanism of 5G new radio (NR), true 5G, and creates a platform for upcoming 6G communications, to achieve low latency and high data rate requirements.

The communication system 100 and the method of the present disclosure ensure seamless connectivity as well as Quality of Experience (QoE). The communication system and the method of the present disclosure significantly improve performance in terms of data throughput and signal-to-noise ratio (SNR) of one or more UEs 106 present in a vehicle (e.g., the vehicle 116N) by effectively controlling cooperation between two edge devices (e.g., the first edge device 112A and the second edge device 112B) arranged in the vehicle. The central cloud server 102, which upon discovering that both the edge devices (e.g., the first edge device 112A and the second edge device 112B) have an active synch path, is able to elect the edge device (e.g., the first edge device 112A) that is dominant in terms of Reference Signal Received Power (RSRP) and the SNR and may purposefully enfeeble the non-dominant edge device (e.g., weaken its Tx power) that was acting as the noise source. The one or more UEs 106 may then be connected to the dominant edge device (e.g., the first edge device 112A), which is observed to significantly improve the performance of the one or more UEs 106. Furthermore, the use of the dominant edge device for uplink and downlink communication by the one or more UEs 106 substantially reduces the battery draining issue of the one or more UEs 106 when present in the vehicle in motion (e.g., the vehicle 116N).

Other benefits of the communication system 100 include minimizing the complexity and substantially reducing the initial access latency as the standard beam sweeping operation in the initial access phase is bypassed and is not required to be performed at the end-user device (e.g., UEs) or edge devices, which in turn improves network performance of all associated WCNs of the plurality of different WCNs 110. For example, based on the various information acquired from the plurality of vehicles 116 via the one or more edge devices (i.e., the first type of edge devices 104A) arranged on each vehicle of the plurality of vehicles 116 and the one or more network nodes, such as the plurality of RSU devices 114 (i.e., the second type of edge devices 104B) and the plurality of base stations 108, over a period of time, the central cloud server 102 creates a connectivity enhanced database that specifies a plurality of specific uplink and downlink beam alignment-wireless connectivity relationships for a surrounding area of each of the plurality of edge devices 104 independent of the plurality of different WCNs 110. This removes the complexity and substantially reduces the initial access latency as the standard beam sweeping operation in the initial access phase is bypassed and is not required to be performed at the end-user device (e.g., UEs) or edge devices, which in turn improves network performance of all associated WCNs of the plurality of different WCNs 110. The central cloud server 102 is able to handle heterogeneity in wireless communication in terms of different interfaces, radio access technologies (3G, 4G, 5G, or upcoming 6G), computing technologies (e.g., hardware and operating systems), and even one or more carrier networks used by the one or more UEs 106. Moreover, the central cloud server 102 considers the dynamic nature of surroundings holistically by use of the sensing information obtained from the plurality of edge devices 104 in real-time or near real-time to proactively avoid any adverse impact on reliability due to any sudden signal blockage, signal fading, signal scattering, or signal loss, thereby provisioning consistent high-speed, low latency wireless connectivity. Thus, the central cloud server 102 manifest higher QoE as compared to existing systems. Additionally, as the initial access information is provided in real-time or near real-time by a relevant inference server or the central cloud sever much ahead of time before an actual handover to a new gNB is expected, the disclosed communication system is able to proactively handle and avoid existing signaling overhead issues that result from quick variations of wireless channels in mobility applications, such as V2X systems.

Figure 2:
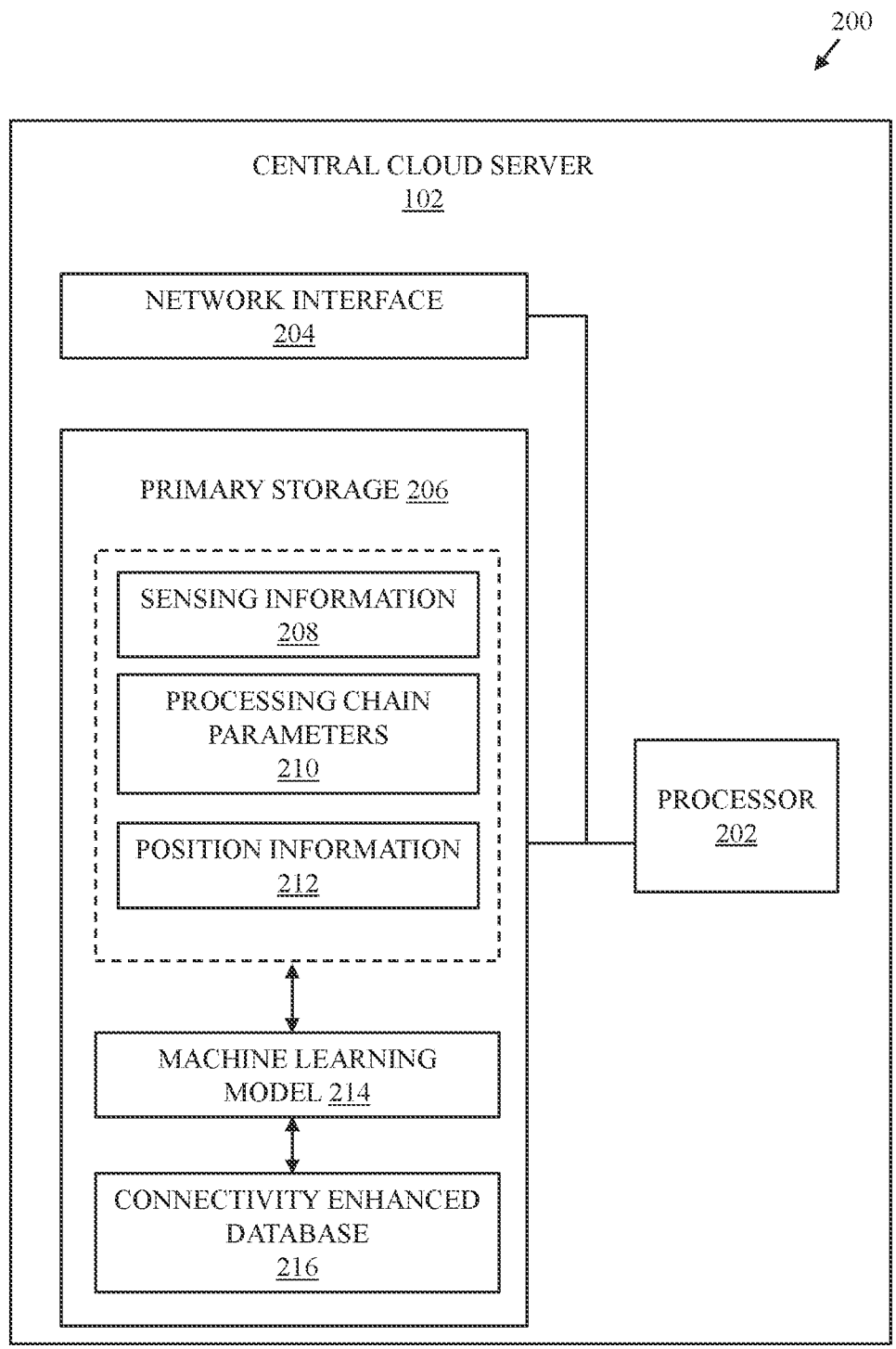
FIG. 2 is a block diagram illustrating different components of an exemplary central cloud server, in accordance with an embodiment of the disclosure.

FIG. 2 is a block diagram illustrating different components of an exemplary central cloud server, in accordance with an embodiment of the disclosure. FIG. 2 is explained in conjunction with elements from FIG. 1. With reference to FIG. 2, there is shown a block diagram 200 of the central cloud server 102. The central cloud server 102 may include a processor 202, a network interface 204, and a primary storage 206. The primary storage 206 may further include sensing information 208 and processing chain parameters 210. In an implementation, the primary storage 206 may further include position information 212 of a plurality of network nodes that includes the plurality of RSU devices 114 and the plurality of base stations 108. There is further shown a machine learning model 214 and connectivity enhanced database 216.

In operation, there may be a training phase and an inference phase. In the training phase, the processor 202 may be configured to obtain sensing information 208 from the plurality of vehicles 116 as the plurality of vehicles 116 move along a first travel path. The first travel path may share a plurality of geographical areas that remain covered by a coverage area of one base station, uncovered by any base station, or partially or mutually covered by the plurality of base stations 108, such as the first base station 108A and the second base station 108B, of same or different service providers (i.e., the plurality of different WCNs 110). Each vehicle may comprise two or more edge devices (e.g., one of or more of the first type of edge devices 104A) arranged such that a donor side of each edge device faces an exterior of each vehicle to communicate with one or more network nodes and a service side of each edge device faces an interior of each vehicle to service the one or more UEs 106 within each vehicle of the plurality of vehicles 116. Each of the plurality of vehicles 116 may be configured to communicate the sensing information 208 to the central cloud server 102, for example, via the two or more edge devices arranged at each vehicle. In an implementation, two edge devices may be arranged on each vehicle of the plurality of vehicles 116. The plurality of vehicles 116 may include autonomous vehicles, semi-autonomous vehicles, and/or non-autonomous vehicles. As each vehicle of the plurality of vehicles 116 may comprise two edge devices (e.g., two repeaters that belong to the first type of edge devices 104A) mounted on it, a location of each of the two edge devices may change rapidly, when a corresponding vehicle on which the two edge devices is installed is in motion. The two edge devices may periodically sense its surroundings and communicate the sensed data as the sensing information 208 to the central cloud server 102.

In accordance with an embodiment, the two edge devices may be arranged at different positions of each corresponding vehicle. For example, one edge device (e.g., the first edge device 112A) may be arranged at the front side of the vehicle 116A, whereas the other edge device (e.g., the second edge device 112B) may be arranged at the rear side of the vehicle 116A. The front side and rear side may be ascertained based on a driving area and rear passenger area, respectively. In another example, the one edge device may be arranged at a first side (e.g., a left door side) of a given vehicle, whereas the other edge device may be arranged at a second side (e.g., a right door side) opposite to the first side of the given vehicle, as shown. The left and right of the given vehicle may be ascertained from a perspective of a user standing at the rear of the given vehicle and viewing the given vehicle from the rear side while the given vehicle may be moving ahead and away from the user.

In the training phase, the two edge devices arranged at each vehicle may be configured to capture sensing information of a surrounding of each vehicle. The two edge devices may be configured to utilize a vehicle sensing system to acquire sensor data and communicate as such the sensor data as the sensing information 208 to the central cloud server 102. In an implementation, the two edge devices may be configured to selectively filter such sensor data from the vehicle sensing system to extract relevant features as the sensing information 208 before sending to the central cloud server 102 in the training phase. For example, features such as a location of a vehicle, a moving direction, a travel path, speedometer readings or a rate of change of speed, an orientation, a time-of-day, traffic light information, nearby bridges, weather information, a presence of reflective objects, etc., may be extracted from the sensor data of the vehicle sensing system and parodically communicated as the sensing information 208 to the central cloud server 102.

In accordance with an embodiment, the sensing information 208 may comprise a location of each of the two edge devices arranged on each vehicle of the plurality of vehicles 116, a moving direction of the plurality of vehicles 116, a local time-of-day, a local traffic information, a local road information, a local construction information, a local traffic light information, and information from one or more in-vehicle sensing devices of the plurality of vehicles 116. In some implementation, the sensing information 208 may further include a location of the one or more UEs 106. The location of the one or more UEs 106 may be obtained in a case where each of the one or more UEs 106 may have an application installed in it. In accordance with an embodiment, at least the first UE 106A of the one or more UEs 106 may comprise an application that may cause the first UE 106A to be designated as a known user to the central cloud server 102. The central cloud server 102 obtains the sensing information 208 and stores the data points of such sensing information 208 as input features.

In some implementation, the two edge devices of the first type of edge devices 104A mounted on each vehicle may be configured to utilize external sensing devices, such as Lidar, camera, accelerometer, Global Navigation Satellite System (GNSS), gyroscope, or Internet-of-Things (IoT) devices (e.g., video surveillance devices, road-side sensor systems for measuring speed, local road conditions, local traffic, and the like) located within its communication range to acquire sensing information 208 from such external devices. For example, an edge device may be a repeater device mounted on a vehicle and communicatively coupled to different in-vehicle sensors via an in-vehicle network so as to acquire the sensing information 208 from such in-vehicle sensors (i.e., the external sensors) in real-time or near time. The machine learning model 214 of the central cloud server 102 may be periodically (e.g., daily and for different times-of-day) trained on data points that are uploaded to the central cloud server 102.

In some implementation, the sensing information 208 may further be obtained from the second type of edge devices 104B, such as the plurality of RSU devices 114. Each edge device of the plurality of edge devices 104 may use its own sensing mechanism, such as a sensing radar, to sense its surrounding environment. In such a case, when the sensing mechanism is present, the sensing information 208 may further be obtained from the second type of edge devices 104B, such as the plurality of RSU devices 114. In some implementations, the sensing information 208 may further be obtained from UEs (e.g., smartphones) controlled by the central cloud server 102. As the sensing information 208 is obtained periodically from various edge devices, such as the first type of edge devices 104A and the second type of edge devices 104B, of the plurality of edge devices 104, all changes in the surroundings of each edge device is adequately captured and relayed to the central cloud server 102.

The machine learning model 214 of the central cloud server 102 may be periodically (e.g., daily and for different times of day) updated on such data points in real-time or near time. The central cloud server 102 may be further configured to cause the machine learning model 214 to find correlation among such data points. The correlated data points may be used for a plurality of predictions and formulate rules to establish wireless connectivity for different geographical locations along the first travel path in advance for various traffic scenarios to serve the two edge devices arranged at each vehicle and to identify improved (e.g., optimal) signal transmission paths to reach to the two edge devices of the first type of edge devices 104A arranged at each vehicle for efficient handover for wireless connectivity at a later stage (i.e., in the inference phase). Based on the sensing information 208 obtained from the plurality of vehicles 116 (and optionally from the plurality of RSU devices 114), the processor 202 may be further configured to detect where reflective objects are located and used that information in the radiation pattern of the RF signals, such as 5G signals. The sensing information 208 may be used to make a radiation pattern that is correlated to areas such that the communicated RF signals are not reflected back. This means that when one or more beams of RF signals are communicated from the two edge devices arranged at each vehicle or the plurality of RSU devices 114, comparatively significantly lower or almost negligible RF signals are reflected back to the two edge devices of the first type of edge devices 104A and the plurality of RSU devices 114 of the second type of edge devices 104B. The location of the reflective objects and the correlation of the areas associated with reflective objects with the radiation pattern to design enhanced or most suited beam configurations may be further used by the processor 202 to formulate rules for later use.

In accordance with an embodiment, the sensing information 208 may further comprise weather information. The processor 202 may be further configured to utilize the weather information to determine one or more changes in a performance state in different weather conditions of each of the one or more edge devices (i.e., the one or more edge devices arranged at each vehicle) across the plurality of geographical areas along the first travel path. It is known that more attention is provided in the region between 25-300 GHz frequencies due to the large bandwidth which is available in this region to enable the plurality of different WCNs 110 to cope with the increasing demand for higher data rates and ultra-low latency services. However, the signals at frequencies above 25 GHz may not propagate for long distances as those below 25 GHz. Moreover, there is signal attenuation due to weather factors, such as humidity, rain, ice, different types of storms, and even there is a difference observed during summer and winter on the signal power level. For example, the signal loss difference between winter and summer for 28 GHz may be about 1 dB, about 2 dB for 37 GHz, about 4 dB for 60 GHz. Such losses may increase with frequency and distance. The processor 202 utilizes such weather information to determine one or more changes in a performance state of each of the two edge devices (i.e., the one or more edge devices arranged at each vehicle) as well as the plurality of RSU devices 114 across the plurality of geographical areas along the first travel path in different weather conditions. Accordingly, the processor 202 by use of the machine learning model 214 may be configured to learn a correlation between different weather conditions and signal power level and other performance state of each of the two edge devices arranged at each vehicle in servicing the one or more UEs 106. Accordingly, the processor 202 may be further configured to formulate rules to establish, maintain, and predict alternative solutions in advance to mitigate signal losses in various weather conditions to serve the two edge devices arranged at each vehicle and to identify improved (e.g., optimal) signal transmission paths to reach to the two edge devices arranged at each vehicle at a later stage (i.e., in the inference phase). For example, the processor 202 may be further configured to cause the two edge devices arranged at each vehicle as well as the one or more RSU devices to select the most appropriate beam configurations or radiation pattern in real-time or near real-time in accordance with the weather condition obtained as a part of the sensing information 208 (i.e., in the inference phase).

In accordance with an embodiment, the two edge devices arranged at each vehicle of the plurality of vehicles 116 may be further configured to periodically communicate the processing chain parameters 210 to the central cloud server 102. All such measurements and feedback are sent to the central cloud server 102 for learning. The sensing information 208, the processing chain parameters 210 of the two edge devices arranged at each vehicle, and the position information 212 associated with each vehicle of the plurality of vehicles 116 may be correlated by the central cloud server 102 to generate the connectivity enhanced database 216 holistically for the plurality of different WCNs 110. In an example, the processor 202 may be further configured to obtain processing chain parameters 210 from the donor side of each edge device of the plurality of vehicles 116 as the plurality of vehicles 116 move along the first travel path. As the two edge devices arranged at each vehicle may be in motion, the changes in a channel may be more prominent at the donor side that faces the one or more network nodes, such as the first base station 108A, the second base station 108B, and the one or more RSU devices, such as the RSU devices 114A and 114B. In accordance with an embodiment, the processing chain parameters 210 obtained from each edge device of the plurality of vehicles 116 may comprise information associated with elements of one or more cascaded receiver chains and one or more cascaded transmitter chains of each edge device, radio blocks information, and modem information of each edge device of the plurality of vehicles 116.

In some implementations, the processor 202 may be further configured to obtain processing chain parameters 210 from the plurality of edge devices 104 that includes both the first type of edge devices 104A (i.e., one or more edge devices arranged at each vehicle) and the second type of edge devices 104B, such as the plurality of RSU devices 114. Thus, the processing chain parameters 210 include information associated with elements of one or more cascaded receiver chains and one or more cascaded transmitter chains of each edge device, radio block information, and modem information of the plurality of edge devices 104. The central cloud server 102 may be configured such that it has access to certain defined elements or all elements of one or more signal processing chains of each of the plurality of edge devices 104. For example, each of an uplink RF signal processing chain and a downlink RF signal processing chain may include a cascading receiver chain for signal reception, which includes elements, such as a set of low noise amplifiers (LNA), a set of receiver front end phase shifters, and a set of power combiners. Similarly, each of the uplink RF signal processing chain and the downlink RF signal processing chain may further include a cascading transmitter chain for baseband signal processing or digital signal processing for signal transmission, which includes elements such as a set of power dividers, a set of phase shifters, a set of power amplifiers (PA). There may be other elements and circuits like mixers, phase-locked loops (PLL), frequency up-converters, frequency down-converters, a filter bank that may include one or more filters, such as filters for channel selection or other digital filters for noise cancellation or reduction. The central cloud server 102 may be configured to securely access, monitor, and configure the information associated with such elements of one or more cascaded receiver chains and one or more cascaded transmitter chains of each edge device to optimize each radio block and overall radio frequency signals, such as 5G signals.

In a first example, the central cloud server 102 may remotely access elements of the one or more signal processing chains, like the set of phase shifters, and utilize that, for example, to train the machine learning model 214, and optimize every block of an RF signal including phase (e.g., can control the phase-shifting), etc. In a second example, the central cloud server 102 may remotely access information associated with elements, such as a set of LNAs to train the machine learning model 214, and utilize that information, for example, to learn and control amplification of input RF signals received by an antenna array, such as the one or more first antenna arrays or the one or more second antenna arrays, in order to amplify input RF signals, which may have low-power, without significantly degrading corresponding signal-to-noise (SNR) ratio in the inference phase. In a third example, the central cloud server 102 may remotely access information (e.g., phase values of one or more input RF signals) associated with elements, such as a set of phase shifters, to train the machine learning model 214, and control adjustment in phase values of the input RF signals, till combined signal strength value of the received input RF signals, is maximized to design beams in the inference phase. In a fourth example, the central cloud server 102 may be configured to train the machine learning model 214 with parameters (e.g., amplifier gains and phase responses) associated with one or more first antenna arrays or one or more second antenna arrays, and later use learnings in the inference phase to send control signals to remotely configure or control such parameters. In a fifth example, the central cloud server 102 may be configured to access beamforming coefficients from elements of the one or more signal processing chains to train the machine learning model 214 and use such learnings to configure, and control, and adjust beam patterns to and from each of the plurality of edge devices 104 (i.e., the two edge devices of each vehicle as well as the plurality of RSU devices 114). In a sixth example, as the central cloud server 102 has information associated with elements of one or more cascaded receiver chains and one or more cascaded transmitter chains of each edge device, the central cloud server 102 may configure dynamic partitioning of a plurality of antenna elements of an antenna array into a plurality of spatially separated antenna sub-arrays to generate multiple beams in different directions to establish independent communication channels with the one or more UEs 106 at the same time or in a different time slot. In a seventh example, since the central cloud server 102 has information associated with elements of one or more cascaded receiver chains and one or more cascaded transmitter chains of each edge device, the central cloud server 102 may be further configured to accurately determine a transmit (Tx) beam information, a receive (Rx) beam information, a Physical Cell Identity (PCID), and an absolute radio-frequency channel number (ARFCN), and a signal strength information associated with each of Tx beam and the Rx beam of the plurality of edge devices 104 for the plurality of different WCNs 110. In an eighth example, since the central cloud server 102 has information associated with elements of one or more cascaded receiver chains and one or more cascaded transmitter chains of each edge device, the central cloud server 102 may configure and instruct an edge device (e.g., mounted at each vehicle) for a suitable adjustment of a power back-off to minimize (i.e., substantially reduce) the impact of interference (echo or noise signals) and hence only use as much power as needed to achieve low error communication with one or more base stations in the uplink or the one or more UEs 106 in the downlink communication. In accordance with an embodiment, the central cloud server 102 may be further configured to configure, monitor, and provide management, monitoring, and configuration services to, various layers of each of the plurality of edge devices 104 to optimize blocks of radio and perform Radio access network optimization to improve coverage, capacity, and service quality.

It is known and specified in 3GPP that a radio frame of a 5G NR frame structure may include ten sub-frames, where each sub-frame, includes one or more slots based on different configurations. In an example, a sub-frame may include one slot, where each slot may include 14 symbols (e.g., 14 OFDM symbols). In a case where a sub-frame has two slots, then the radio frame has 20 slots. Similarly, in a case where the sub-frame has four slots, then the radio frame has 40 slots, where the number of OFDM symbols within a slot is 14. It is also known that NR Time-division duplexing (TDD) uses flexible slot configuration, where the flexible symbol can be configured either for uplink or for downlink transmissions.

In an implementation, the central cloud server 102 may obtain radio block information and may access decoded control information from each of the plurality of edge devices 104 (i.e., the two edge devices arranged at each vehicle and the second type of edge devices 104B, such as the plurality of RSU devices 114). The decoded control information may include (or indicates) a periodicity and a downlink/uplink cycle ratio, a time division duplex (TDD) pattern, an NR TDD slot format, or a plurality of NR TDD slot formats in a sequence. In accordance with an embodiment, the central cloud server 102 may obtain a physical cell identifier (PCID), an absolute radio-frequency channel number (ARFCN), and other properties of the plurality of base station of the plurality of different WCNs 110 through the network (e.g., 4G LTE, 5G NR, Internet, or any other wireless communication network). The central cloud server 102 may further receive a channel quality indicator and other channel estimates as feedback from the plurality of edge devices 104 (i.e., the two edge devices arranged at each vehicle or the second type of edge devices 104B, such as the plurality of RSU devices 114).

In accordance with an embodiment, by virtue of the obtained modem information from the plurality of edge devices 104, the central cloud server 102 may have information of more than one device modem and thus have holistic information (e.g., an operating behavior) of different modems of many edge devices in a geographical area, which can be used to train the machine learning model 214 and optimize the radio communication (e.g., signal propagation) holistically for the entire geographical area. In an implementation, a software application for each modem of an edge device may run on the central cloud server 102 rather in the modem of an edge device, such as a repeater device. For example, one virtual machine (VM) may be dedicated to one modem of an edge device. As the central cloud server 102 has information of more than one device modem, it will know about other modems of other edge devices in a given geographical area. Thus, the high computational resource capable device (i.e., the central cloud server 102) can optimize radio signal propagation and channel characteristic of the given geographical area more holistically for the plurality of different WCNs 110 instead of just one WCN, thereby improving network performance of the plurality of different WCNs 110 and providing high-performance wireless communication for the given geographical area (and similarly other geographical areas) to improve QoE.

In accordance with an embodiment, the processor 202 may be further configured to access a Serial Peripheral Interface (SPI) between a modem and the radio (e.g., the front-end RF section) of each of the plurality of edge devices 104 (i.e., the two edge devices arranged at each vehicle or the second type of edge devices 104B, such as the plurality of RSU devices 114). The SPI may be a full-duplex bus interface used to send data between a control circuitry (e.g., a microcontroller or DSP) and other peripheral components, such as the modem, for example, a 5G modem, and sensing radar (when present) in an edge device. The SPI interface supports very high speeds and throughput and is suitable for handling a lot of data. In an example, the processing chain parameters 210 may be accessed using the SPI.

In accordance with an embodiment, the processor 202 may be further configured to obtain position information 212 of the one or more network nodes that includes the plurality of RSU devices 114 and the plurality of base stations 108 exclusively, partially, or mutually covering the plurality of geographical areas. The processor 202 may be further configured to correlate the obtained sensing information 208, the obtained position information 212, and the processing chain parameters 210 for different times of a day such that the connectivity enhanced database 216 is generated that specifies a plurality of specific uplink and downlink beam alignment-wireless connectivity relationships for a plurality of different locations of edge device within each of geographical area of the plurality of geographical areas of the first travel path and other travel paths in a given region (e.g., a city and similarly each region of a country). Alternatively stated, the processor 202 may be further configured to generate the connectivity enhanced database 216 over first period of time, based on a correlation among the obtained sensing information 208, the processing chain parameters 210, and the position information 212 of the one or more network nodes, where the connectivity enhanced database specifies a plurality of uplink-and-downlink beam alignment-wireless connectivity relationships for each of the plurality of geographical areas along the first travel path for the different service providers. The correlation is executed not just for one WCN but holistically for the plurality of different WCNs 110. The correlation indicates that for a given set of input features extracted from the sensing information 208 and the position information 212, what is the most suitable (i.e., best) initial access information for a given edge device (i.e., a given edge device mounted on a vehicle or a given edge device of the second type of edge devices 104B, such as an RSU device) according to its position to service the one or more UEs 106 in its surrounding area such that a high-speed and low latency wireless connectivity can be achieved with increased consistency. The processor 202 may be further configured to determine the plurality of uplink and downlink beam alignment-wireless connectivity relationships for different times of day. The connectivity enhanced database 216 may be a low-latency database, for example, "DynamoDB," "Scylla," or other proven and known low-latency databases that can handle one or more million transactions per second on a single cloud server. The time-of-day specific uplink beam-alignment-wireless connectivity relation specifies, for the given set of input features for a given time-of-day, which beam index to set at an edge device (e.g., mounted on a vehicle) for the uplink communication, a specific Physical Cell Identity (PCID) which indicates which gNB to connect to, or which WCN to select, which specific beam configuration to set, or whether a connection to the base station is to be established directly by the two edge devices arranged in each vehicle or indirectly in an NLOS path using one or more RSU devices of the plurality of RSU devices 114. Similarly, the time-of-day specific downlink beam-alignment-wireless connectivity relation specifies, for the given set of input features for a given time-of-day, which beam index to set at an edge device (e.g., an edge device mounted on a vehicle or an RSU device that services the edge device of the vehicle) for the downlink communication, which WCN to select, which specific beam configuration to set, what power level of the RF signal may be sufficient, or an expected time period to service one or more UEs, such as the first UE 106A, depending on the current location of the edge device. Thus, as the set of input features changes, the initial access information also changes for the given edge device according to the changed set of input features to continue servicing the one or more UEs, such as the first UE 106A, without any drop in QoE. Moreover, as the connectivity enhanced database 216 is independent of the plurality of different WCNs 110, the complexity and the initial access latency is significantly reduced as the standard beam sweeping operation in the initial access phase is bypassed and is not required to be performed at the end-user device or edge devices, which in turn improves network performance of the associated WCNs of the plurality of different WCNs 110. Furthermore, this way, a consumer, such as the first UE 106A, is provided with the capability to choose which WCN (i.e., which service provider) they like to connect to, and this is enabled from the cloud, such as the central cloud server 102. The processor 202 may be configured to transfer such specific initial access information associated with a WCN, such as the first WCN 110A to each of the two edge devices of each vehicle, where such specific initial access information is used by the corresponding edge device to establish wireless connectivity by passing conventional initial-access search. For example, a consumer with a UE, such as the first UE 106A, subscribed to the first WCN 110A can request the edge device, such as the first edge device 112A, arranged at the vehicle 116A to relay an RF signal of the first WCN 110A, and if the consumer with the UE, such as the first UE 106A, is subscribed to the second WCN 110B can request the edge device, such as the first edge device 112A, of the vehicle 116A to relay an RF signal of the second WCN 110B. The correlation further improves QoE and indicates that for a given set of input features extracted from the sensing information 208 and the position information 212, insights are provided as to what were the processing chain parameters 210 when there was most suitable (i.e., best) initial access information for a given edge device, and hence it allows optimal management of network resources including the plurality of edge devices 104 in the inference phase.

In accordance with an embodiment, the processor 202 may be further configured to extract and tag parameters of the processing chain parameters 210 as learning labels (e.g., supervised learning labels or unsupervised output values). The obtained sensing information 208 and the position information 212 may be considered as input features, whereas the processing chain parameters 210 may be considered as learning labels for the correlation. The processor 202 may be further configured to execute a mapping of the learning labels with one or more input features of the obtained sensing information 208 and the position information 212 until the plurality of uplink and downlink beam alignment-wireless connectivity relationships is established for each of the plurality of geographical areas along the first travel path for the different service providers.

In an implementation, a machine learning algorithm, for example, an artificial neural network algorithm, may be used at the beginning before training with the real-world training data of input features and parameters of the processing chain parameters 210 as supervised learning labels. When the machine learning algorithm is passed through the training data of correlated input features and parameters of the processing chain parameters 210, the machine learning algorithm determines patterns such that the input features (e.g., a position of each of the two edge devices of each vehicle, a position of one or more RSU devices of the plurality of RSU devices 114, a position of the plurality of base stations 108, a weather condition, a moving direction, a time-of-day, any change in a surrounding area in terms of signal blockage or attenuation, etc., traffic condition, road information, an association with a current WCN, and current connection parameters with a gNB) are mapped to the learning labels (e.g., best initial access information, such as best PCID, best beam index to be used, signal strength measurement of a Tx/Rx beam, beam configuration, best transmission path, an absolute radio-frequency channel number (ARFCN), etc.). Since the machine learning model 214 is trained periodically, so if the base station (e.g., a gNB) configuration is changed (e.g., a new sector or gNB is added or the PCID, ARFCN is changed), the machine learning model 214 quickly adapts to the change. The processor 202 is further configured to cause the machine learning model 214 to assign more weight to recent data points using, for example, an exponential time decay process. The machine learning model 214 may be a learned model generated as output in the training process, and thus, over a period of time, the machine learning model 214 is able to predict the specific initial access information most suited for a given set of input features. Alternatively, in another implementation, a convolutional neural network (CNN) may be used for deep learning, where the input features of the sensing information 208 and the position information 212 and their relationship with the desired output values may be derived automatically. Thus, at the end of the training phase, the connectivity enhanced database 216 is generated that specifies the plurality of uplink and downlink beam alignment-wireless connectivity relationships for each of the plurality of geographical areas along the first travel path for the different service providers. The plurality of uplink and downlink beam alignment-wireless connectivity relationships may be time-of-day specific uplink and downlink beam alignment-wireless connectivity relationships for the plurality of different WCNs 110. Thus, the connectivity enhanced database 216 is obtained, which is used in the inference phase to execute various functions for high-speed low-latency wireless connectivity for various mobility applications.

In accordance with an embodiment, the processor 202 of the central cloud server 102 may be further configured to distribute a subset of information (i.e., a different subset of information) from the generated connectivity enhanced database 216 to each of the plurality of inference servers 118 according to a corresponding geographical zone of the plurality of different geographical zones served by each of the plurality of inference servers 118. The plurality of inference servers 118 may be distributed across the plurality of different geographical zones and act as endpoints of the central cloud server 102. Each inference server of the plurality of inference servers 118 may be configured to serve a defined number of base stations of the plurality of base stations 108, a defined number of edge devices of the plurality of edge devices 104 that includes the first type of edge devices 104A (e.g., the two edge devices arranged at each vehicle) and the second type of edge devices 104B, for example, a defined number of RSU devices of the plurality of RSU devices 114.

In some implementations, the machine learning model 214 may be deployed on several machine learning endpoints as the plurality of inference servers 118 in multiple geographical zones. In an exemplary implementation, the machine learning model 214 may be deployed on several machine learning endpoints using "AWS Sagemaker" endpoints. Each inference server, such as the inference server 118A, may periodically receive real-time requests from all the edge devices (e.g., the one or more edge devices arranged at each vehicle or the defined number of RSU devices) within its geographical zone. These requests may include the input features (such as a location, a time-of-day, an accelerometer reading, a moving direction of a vehicle, a weather condition, etc.). The relevant inference server may be configured to processes these requests within a few milliseconds and returns a response that includes the best initial access information (e.g., a best donor beam index, a best service beam index, a best beam configuration, a specific ARFCN, a specific PCID, etc.) back to a requesting edge device.

In accordance with an embodiment, the different subset of information from the generated connectivity enhanced database 216 may cause each of the plurality of inference servers 118 to service edge devices of the plurality of edge devices 104 of its corresponding geographical zone independent of the plurality of different WCNs 110 and bypassing an initial access-search on the corresponding edge device. In the inference phase or the operational phase, whenever one or more new vehicles arrive in a later stage, instead of conducting an initial access-search on an edge device of each of the one or more new vehicles, the central cloud server 102 assists the edge device by providing them with optimized initial access information (e.g., best beam index, best beam configuration, best ARFCN, and PCID) that it has learned the machine learning model 214 during the training phase. Moreover, as the different subset of information from the connectivity enhanced database 216 is distributed in advance to each of the plurality of inference servers 118, each of the edge devices of the plurality of edge devices 104 may request its corresponding inference server and receive a response in a few milliseconds to identify the optimized initial access information much faster than standard initial access procedure. Such subset of information is updated in real-time or near time whenever there is a change in the surrounding environment that may potentially affect signal propagation from the one or more fixed network nodes, such as one or more base stations or the second type of edge devices 104B, such as the one or more RSU devices, to the first type of edge devices 104A, such as the two edge devices arranged at each vehicle.

Thus, in the inference phase, the processor 202 of the central cloud server 102 (or a respective inference server, such as the inference server 118A) may be configured to send wireless connectivity enhanced information from the connectivity enhanced database 216 that includes specific initial access information directly to the donor side of the first edge device 112A of a given vehicle (e.g., the vehicle 116A) when the given vehicle (e.g., the vehicle 116A) arrives and moves along one or more first geographical areas of the plurality of geographical areas along a given travel path. Such communication of the wireless connectivity enhanced information directly to the donor side of the first edge device 112A of the given vehicle (e.g., the vehicle 116A) may be done when the received input features from the first edge device 112A and the second edge device 112B indicates that signal propagation is favorable for direct communication for the received set of input features for travel within the one or more second geographical areas of the plurality of geographical areas along the given travel path, and the first edge device 112A may directly attach to a new gNB or via an RSU device (e.g. a small-cell).

In accordance with an embodiment, each of the plurality of inference servers 118 may be configured to receive a real-time or a near real-time request from an edge device of a plurality of edge devices 104 within its geographical zone. The plurality of edge devices 104 corresponds to the plurality of RSU devices 114 and the two edge devices arranged on each vehicle of the plurality of vehicles 116. In an implementation, a first inference server, such as the inference server 118A, of the plurality of inference servers 118 may be configured to receive a real-time or a near real-time request from each of the two edge devices arranged at each vehicle. The real-time or the near real-time request may comprise one or more input features corresponding to the sensing information 208 from the two edge devices arranged at a corresponding vehicle. The response may comprise wireless connectivity enhanced information that includes specific initial access information to each of the two edge devices arranged at each vehicle, such as the vehicle 116A, to bypass the initial access-search on the two edge devices of the given vehicle (e.g., the vehicle 116A).

In accordance with an embodiment, the processor 202 may be further configured to determine, based on a position of each of the two edge devices arranged at the given vehicle (i.e., the vehicle 116A), whether a handover is required, and if so, communicate wireless connectivity enhanced information including specific initial access information to each of the two edge devices arranged at the given vehicle (e.g., the vehicle 116A). This enables the donor side one or both of the first edge device 112A and the second edge device 112B to attach to a new base station (e.g., a new gNB) directly or via the one or more RSUs. The processor 202 may be further configured to communicate the wireless connectivity enhanced information directly to each of the one or more RSU devices or indirectly via the first inference server (e.g., the inference server 118A) serving a geographical zone encompassing at least the one or more first geographical areas of the plurality of geographical areas along the first travel path.

In accordance with an embodiment, the processor 202 may be further configured to determine that no handover is required for two edge devices arranged at the given vehicle (e.g., the vehicle 116A) when a performance state of cellular connectivity of the first edge device 112A and the second edge device 112B of the vehicle 116A is greater than a threshold performance value.

In a case where a wireless connection (e.g., a cellular connectivity) of the first edge device 112A or the second edge device 112B of the vehicle 112N in motion is about to become less than a threshold performance value, such potential performance drop proactively may be predicted by the central cloud server 102 based on new sensing information received from the first edge device 112A and the second edge device 112B itself or from one or more RSU devices in the vicinity of the first edge device 112A. For example, the first edge device 112A may be attached to the first base station 108A, and as the vehicle 116N moves, the distance from the first base station 108A may increase, and the signal strength may gradually decrease. Thus, based on input features obtained from the new sensing information, such as a moving direction of the new vehicle, a position of the new vehicle, a distance from one or more RSU devices in the vicinity of the new vehicle, a current weather condition, the location of the reflective objects around the first edge device of the new vehicle, and an overall 3D environment representation around the new vehicle, the processor 202 determines that a handover is required to maintain QoE based on input features obtained from the new sensing information. In a case where the input features are communicated to a given inference server deployed within a geographical zone, then the given inference server (e.g., the inference server 118A) may be configured to determine the decision of the handover.

In the inference phase, the two edge devices, such as the first edge device 112A and the second edge device 112B, may be configured to receive an activation request to activate the two edge devices. The request may be received from one of the one or more UEs 106, such as the first UE 106A, or via the in-vehicle network 414 based on input via a user interface (UI). The activation request may be received via an out-of-band communication, such as Wi-Fi, Bluetooth, a personal area network (PAN) connection, or via the in-vehicle network. The two edge devices, arranged at the vehicle 116A may be further configured to communicate new sensing information to the inference server 118A of the plurality of inference servers 118 (or to the central cloud server 102). The vehicle 116A may be designated as the known user based on at least one of: a) an application installed either in the vehicle 116A or one of the one or more UEs 106 present in the vehicle 116A; b) an authentication key; or c) a registered gesture. In an example, the application may be installed in a smartphone connected to an in-vehicle infotainment system of the vehicle 116A or the application may be preinstalled in the vehicle (e.g., in the in-vehicle infotainment system). A unique identity, for example, in the form of the authentication key, or the registered gesture, or other identifying means may be used to identify the vehicle 116A or the two edge devices of the vehicle 116A as the known and valid user to receive services of the central cloud server 102 and other edge devices of the plurality of edge devices 104.

In another aspect, in the inference phase, the two edge devices (i.e., the first edge device 112A and the second edge device 112B) of a vehicle (e.g., the vehicle 116N) and the one or more UEs 106 may be co-located at the vehicle (e.g., the vehicle 116N), where at least one of two edge devices may be wirelessly connected to the central cloud server 102 over an LTE control channel independent of the one or more UEs 106. Alternatively stated, each of the two edge devices may be communicatively coupled to the central cloud server 102 irrespective of the connectivity of the one or more UEs 106. In accordance with an embodiment, each of the first edge device 112A and the second edge device 112B may be an XG-enabled repeater device, and the one or more UEs 106 may be at least one of an XG-enabled smartphone, an in-vehicle infotainment system, an XG-enabled in-vehicle device or another vehicle device, where the term "XG" corresponds to a 5G, beyond 5G, or a 6G radio access communication.

In accordance with an embodiment, the two edge devices (i.e., the first edge device 112A and the second edge device 112B) arranged at the vehicle (e.g., the vehicle 116N) may communicate the sensing information 208 that may include the moving direction of the one or more UEs 106, velocity information, a time-of-day, local traffic information, local road information, local construction information, and local traffic light information. The processor 202 may be further configured to periodically obtain sensing information 208 from the first edge device 112A and the second edge device 112B arranged at the vehicle (e.g., the vehicle 116N).

The processor 202 of the central cloud server 102 may be configured to predict a travel path of the first edge device 112A, the second edge device 112B, and the one or more UEs 106 co-located at the vehicle (e.g., the vehicle 116N) in motion based on the periodically obtained sensing information 208. In other words, the central cloud server 102 predicts a travel path that the one or more UEs 106 present in the vehicle 116A is likely to take based on sensing information received from the two edge devices (e.g., the repeater #1 and the repeater #2) arranged at the vehicle 116A. Moreover, as the two edge devices arranged at the vehicle 116A also communicates the sensing information 208 include the moving direction of the one or more UEs 106, a time-of-day, local traffic information, local road information, local construction information, local traffic light information, the prediction of the travel path can be made more accurately with more accurate failure detection and recovering options.

In one example, based on the location of the first edge device 112A or the second edge device 112B, the moving direction, it may be predicted that the first edge device 112A and the second edge device 112B will have to move to a certain stretch of a travel path (e.g., a first stretch of a first road) for some time, and then based on the road information it may be known that there may be different stretches of roads connecting to the first stretch of the first road. Thus, alternative routes may also be predicted. Thus, in this case, the travel path may be a stretch of a road that the first edge device 112A in motion is to take with the prediction probability of a confidence level greater than a threshold (e.g., greater than 80%) as there are almost no or less options available with the user of the first edge device 112A in motion to change paths (i.e., no options or less options available to change the first road) expect taking turns but following same road. It may be understood that in many cases, the travel path may not be an end destination of the user associated with the first edge device 112A and the second edge device 112B in motion but at least an intermediate point that will at least be traversed by the first edge device 112A or the second edge device 112B in motion predicted with the high confidence level (greater than 80%). In another example, if historical data is available of the user associated with the first edge device 112A or the second edge device 112B in motion that for a given time-of-day, the user drives from a point A to point B, then the travel path may be predicted by correlating with other sensing information 208 (e.g., the location of the first edge device 112A and the second edge device 112B, the moving direction in the travel path, etc.) with high confidence level (e.g., greater than 80%) and the travel path may be an end-to-end travel path comprising an entire route from a starting point to the destination point. In yet another example, if the user associated with the two edge devices has provided an input of a destination point using a map service, then the route information may be used along with the traffic information, the road information, the construction information, and traffic light information, to predict the travel path. In some cases, the predicted travel path may be same as the route information. However, in a case where it is estimated that the traffic information indicates huge traffic at a certain location and based on historical data of the user and options available to change the route, it may be predicted that the user is going to adopt a given travel path considered as the predicted travel path, which may be a slight variation of the extracted route information. As the first edge device 112A and the second edge device 112B arranged at the vehicle 116N, and other edge devices arranged at other vehicles also periodically communicates the sensing information 208 including its corresponding local traffic information, local road information, local construction information, local traffic light information, the prediction of the travel path is made more accurately by correlating with the map service.

In accordance with an embodiment, the processor 202 may be further configured to determine a plurality of alternative wireless connectivity options for the one or more UEs 106 present in the vehicle (e.g., the vehicle 116N) in motion or for the first edge device 112A and the second edge device 112B (as the one or more UEs 106 and the first edge device 112A and the second edge device 112B are co-located). In an implementation, each of the two edge devices arranged at the vehicle (e.g., the vehicle 116N) may include a sensor, for example, a geospatial position sensor (such as GPS sensor), which may capture the velocity of its movement. This captured sensing information, for example, the velocity (e.g., indicating speed and moving direction) may be used by the central cloud server 102 to determine one or more alternative wireless connectivity options that may be made available to the one or more UEs 106 in motion. The plurality of alternative wireless connectivity options may be made available to the one or more UEs 106 and/or to the first edge device 112A, and the second edge device 112B in motion in advance for the predicted travel path based on the connectivity enhanced database 216 and the predicted travel path, where each of the plurality of alternative wireless connectivity options comprise a different specific initial access information. For example, a set of top three or four donor beam indexes, service beam indexes, a set of beam configurations, a set of ARFCNs, a set of specific PCIDs, etc., which are most suited for a given location or a given stretch. The connectivity enhanced database 216 specifies a plurality of uplink-and-downlink beam alignment-wireless connectivity relationships for a plurality of geographical areas along the travel path and a plurality of other travel paths for different service providers. In other words, the central cloud server 102 may be guided by the velocity information, which in turn may trigger the central cloud server 102 to elastically alter how many directives (or instructions for alternative wireless connectivity options) it queues to each of the two edge devices, such as the first edge device 112A and the second edge device 112B, arranged at the vehicle (e.g., the vehicle 116N).

The central cloud server 102 may be further configured to communicate and pre-load the determined plurality of alternative wireless connectivity options at each of the first edge device 112A and the second edge device 112B arranged at the vehicle (e.g., the vehicle 116N) to reduce signaling latency between a corresponding source network node (e.g., the first base station 108A) and at least one of the first edge device 112A or the second edge device 112B. In other words, the central cloud server 102 pre-loads impending choices in terms of the plurality of alternative wireless connectivity options to minimize signaling latency between the two edge devices arranged at the vehicle 116A and base stations and/or the central cloud server 102. One or more alternative wireless connectivity options may be used by the one or more UEs 106 (which may be communicatively coupled to one or both of the two edge devices arranged at the vehicle 116N) as fallback options to maintain consistent wireless connectivity to a base station via one or both of the two edge devices arranged at the vehicle (e.g., the vehicle 112N). Since there are instances when the control channel may be briefly lost, such pre-loaded one or more alternative wireless connectivity options may be used by the one or more UEs, such as the first UE 106A, as guidance when cellular connectivity (e.g., 5G wireless connection) is lost for several seconds, such as when the one or more UEs 106, such as the first UE 106A, and the two edge devices provided in the vehicle (e.g., the vehicle 112N) moves in a tunnel or in some remote areas where cellular coverage is sparse. In an implementation, the prediction of the travel path of the two edge devices (and the one or more UEs 106 that are co-located) in motion may be executed based on the machine learning model 214 of the central cloud server 102.

In an implementation, the determined one or more alternative wireless connectivity options made available to the two edge devices arranged at the vehicle 116A as well as the one or more UEs 106, such as the first UE 106A, in motion comprises a plurality of different specific initial access information, where each of the plurality of different specific initial access information is capable of assisting at least one or both of the two edge devices arranged at the vehicle (e.g., the vehicle 112N) to bypass an initial access-search on corresponding edge device of the two edge devices. Each of the plurality of different specific initial access information are alternative options for wireless cellular connectivity communicated to the two edge devices arranged at the vehicle (e.g., the vehicle 112N) based on the current and upcoming location of the two edge devices along the predicted travel path. The central cloud server 102 assists the first edge device 112A and the second edge device 112B by not only providing it with optimized initial access information (e.g., best beam index, best beam configuration, best ARFCN, and PCID) referred to as the primary wireless connectivity option that it has learned the machine learning model 214 during the training phase, but also provides alternative wireless connectivity options as fallback options which can be readily used to connect to a new gNB or to the existing attached gNB with new beam configuration for reduced latency when there is a signal loss or a weak signal. In an example, the central cloud server 102 may be configured to communicate two or more choices, say, four alternative wireless connectivity options, for example, a first, second, third, and fourth choice for wireless connectivity so that at least one or both of the edge devices arranged at the vehicle (e.g., the vehicle 112N) may continue with mmWave connection with the least amount of service disruption. Alternatively stated, when the primary choice fails (i.e., the first communicated wireless connectivity enhanced information that includes a first specific initial access information is not usable for some unforeseen reasons, like loss of signal in a tunnel), other alternative wireless connectivity options can be selected to maintain continuous 5G connectivity for enhanced QoE by at least one of the two edge devices arranged at the vehicle 116A as well as the one or more UEs 106 (which may be connected for uplink and downlink communication via one or both of the edge devices arranged at the vehicle (e.g., the vehicle 112N)). Thus, having more alternative wireless connectivity options act as a powerful technique to maintain consistent 5G connectivity irrespective of an internal beam acquisition process of the two edge devices arranged at the vehicle (e.g., the vehicle 112N). Moreover, as such alternative wireless connectivity options comprise specific initial access information, the standard beam acquisition process is shortened, i.e., the time to scan and acquire new initial access information is shortened, and consequently, failure detection and recovering from it using the provided multiple alternative wireless connectivity options comprises plays a prominent role in increasing the QoE.

Beneficially, after the suitable beam of RF signal is determined and acquired based on assistance from the central cloud server 102 (e.g., based on provided one or more alternative wireless connectivity options), the two edge devices arranged at the vehicle (e.g., the vehicle 112N) may be controlled (e.g., by the central cloud server 102) to ensure that the two edge devices, such as the first edge device 112A and the second edge device 112B, are working together cooperatively to enhance performance and battery power of the one or more UEs 106 present in the vehicle (e.g., the vehicle 112N). For instance, a given vehicle may have two edge devices (e.g., repeater #1 and repeater #2) arranged at two different positions, such as the front side and the rear side, of the given vehicle and both the edge devices may have acquired cellular connection to base stations independent to each other. For example, the first edge device 112A (e.g., repeater #1) arranged at the vehicle (e.g., the vehicle 112N) may be communicatively coupled to the first base station 108A and the second edge device 112B (repeater #2) also arranged at the vehicle (e.g., the vehicle 112N), may be communicatively coupled to the second base station 108B. In such a case, it is observed that one edge device, such as the first edge device 112A, arranged at the vehicle 116A, may act as a source of noise for the other edge device, such as the second edge device 112B, which is also arranged at the vehicle (e.g., the vehicle 112N). It is further observed that in a case where the two edge devices arranged in the same vehicle have acquired independent cellular connections to serve the one or more UEs 106 actually degrade the performance of the one or more UEs 106 in the vehicle 116A. An example of one edge device acting as a source of noise to the other edge device, which results in significantly lowering the SNR and data throughput, is described, for example, in FIG. 4A. It is observed that a received signal power (such as Reference Signal Received Power (RSRP)) of the one or more UEs 106 present in the vehicle 116A in motion generally remain greater than a threshold (i.e., a smartphone's RSRP may remain strong). However, an effective throughput in a communication system degrades significantly. In such scenarios, the following mechanism dramatically improves the performance of the one or more UEs 106 and the two edge devices, such as the first edge device 112A and the second edge device 112B, arranged at the vehicle (e.g., the vehicle 112N).

Firstly, the processor 202 may be configured to detect a presence of an active sync path at each of the first edge device 112A and the second edge device 112B. The first edge device 112A may be arranged at a first location (i.e., a first position, such as front side) at the vehicle 116A and the second edge device 112B may be arranged at a second location (i.e., a second position, such as rear side) of the vehicle 116B. A sync path is one where each of the first edge device 112A and the second edge device 112B (i.e., the repeater #1 and the repeater #2) may decode the Physical Data Shared Channel (PDSCH), and therefore the uplink (UL) and downlink (DL) time slots for the one or more UEs 106, such as a first UE 106A, may be established and this is what is referred to as a "sync path" or the "active sync path". The decoding of PDSCH data (e.g., conversion of PDSCH to codeword bit stream) that may be contained in a resource grid of one sub-frame, is known in the art. In order to be able to carry the data across the 4G/5G radio access network, the data and information is organized into a number of data channels to manage the data transfers and to understand what data is arriving and hence it is able to process it in the required manner. For example, the PDSCH process may enable converting user data into PDSCH data and transmitting it through each transmission antenna. If the received signal is less than a threshold (i.e., a weak signal), the decoding may not succeed, and this may trigger the internal connection management mechanism of the one or more UEs 106 to begin beam scanning and try acquiring a suitable beam. Thus, the central cloud server 102 performs a discovery whether both the first edge device 112A and the second edge device 112B have the active sync path.

The processor 202 may be further configured to determine a dominant edge device and a non-dominant edge device from the first edge device 112A and the second edge device 112B. Once the processor 202 detects that the presence of the active sync path at each of the first edge device 112A and the second edge device 112B, the chances of degrading the performance of the one or more UEs 106 in the vehicle 116 (e.g., effective throughput reduction) caused by the first edge device 112A and the second edge device 112B remain high. Thus, the processor 202 may be further configured to determine which one between the first edge device 112A and the second edge device 112B is the dominant edge device and which one is the non-dominant edge device in terms of received signal power (i.e., RSRP) and SNR. The assessment of which edge device is considered dominant edge device may be a function of the location of the vehicle 116N with respect to a base station (e.g., a gNB) and an expected trajectory of the vehicle 116N. For example, the central cloud server 102 may be configured to determine whether the vehicle 116N is approaching the base station (i.e., the gNB) or receding (i.e., moving away) from the base station (i.e., the gNB). This is a process of self-learning that the edge AI (based on communication from the central cloud server 102) learns over time, and it is able to guide a vehicle connection manager to precisely adjust the local parameters (e.g., adjusting RF-front end and mixer gains) to significantly improve performance. The adjusting of the local parameters may correspond to increasing or decreasing gain and other signal parameters depending on which edge device of the first edge device 112A and the second edge device 112B is considered dominant edge device and which is considered as the non-dominant edge device for a given location of the vehicle 116N. Examples of the local parameters may include, but are not limited to gains, a vehicle heading vector, and environmental factors, such as presence of foliage, buildings, and other signal obstructing objects which may be surrounding the current location of the vehicle 116N.

Thereafter, the processor 202 may be further configured to elect the determined dominant edge device from the first edge device 112A and the second edge device 112B to service one or more UEs 106 in the vehicle 116A. For example, if the first edge device 112A arranged at the first location (e.g., the front side) of the vehicle 116A, is determined as the dominant edge device, then the processor 202 may be configured to elect the first edge device 112A as the dominant edge device. Similarly, if the second edge device 112B arranged at the second location (e.g., the rear side) of the vehicle 116A, is determined as the dominant edge device, then the processor 202 may be configured to elect the second edge device 112B as the dominant edge device.

In accordance with an embodiment, the processor 202 may be further configured to enfeeble the non-dominant edge device at least by reducing a transmit signal power from the determined non-dominant edge device. In other words, the central cloud server 102 upon discovering when both the first edge device 112A and the second edge device 112B (i.e., both the repeater #1 and repeater #2) have the active synch path, is able to elect the dominant edge device in terms of RSRP and SNR and may purposefully enfeeble the non-dominant edge device (e.g., weaken its Tx power) that was acting as the noise source. Moreover, each of the first edge device 112A and the second edge device 112B may have a donor side (hereinafter simply referred to as a donor) and a relay side (or service side, hereinafter referred to as a relay). The non-dominant edge device may be enfeebled (i.e., weakened) altering the receive signal power of the donor and transmit signal power of relay. This triggers signal re-acquisition process at the one or more UEs 106 previously connected to a respective base station via the non-dominant repeater and the one or more UEs 106 may be soft handed (e.g., handover in microseconds) to the dominant edge device. For instance, at least the first UE 106A of the one or more UEs 106 may be connected (attached) to a radio access network (RAN) node via the non-dominant edge device. The RAN node may be a base station, a small cell, or a RSU device. The enfeeblement of the non-dominant edge device triggers a signal re-acquisition process at least at the first UE 106A and the first UE 106A may be soft handed to the dominant edge device to cause an increase in a data throughput rate at least at the first UE 106A. Alternatively stated, the central cloud server 102 may cause the first edge device 112A and second edge device 112B to alter gains of the donor Rx path and the relay Tx path in a manner that beam properties may not be lost but certain gain adjustments may be made to cause the active synch path to be broken. This automatically triggers the internal beam scanning and re-acquisition process at the one or more UEs 106, which may be then readily satisfied by adjusting the gains of the dominant edge device. Thus, the one or more UEs 106 may then begin a signal integrity check and complete their arbitration with the new base station (i.e., a new gNB) connected via the dominant edge device. Thus, the performance of the one or more UEs 106 may be altered (improved) by intentionally weakening a signal of the non-dominant edge device that is either degrading or there is a better pairing possible with the dominant edge device. This knowledge of the dominant edge device and non-dominant edge device may be driven from the central cloud server 102, and when cloud ML (i.e., the machine learning model 214) comes to this inference of the dominant edge device and the non-dominant edge device, it instructs the edge connection management (i.e., the vehicle connection manager) to make appropriate signal strength modifications such that the one or more UEs 106 swiftly roams to the dominant edge device (i.e., the best repeater). This usually occurs in microseconds, and hence, called soft handover. Alternatively stated, the term "soft handed" may refer to a handover with a defined threshold (e.g., less than a second). The defined threshold may be a time where the switchover to the dominant edge device is unnoticeable, i.e., without causing any service interruptions to be experienced by a user.

In accordance with an embodiment, the processor 202 may be further configured to predict whether a cellular connectivity of the dominant edge device in motion that is elected is about to become less than a threshold performance value based on sensing information 208 (updated sensing information) obtained from the first edge device 112A or the second edge device 112B. The processor 202 may then cause the dominant edge device to trigger an alternative wireless connectivity option from the determined plurality of alternative wireless connectivity options along the predicted travel path bypassing an initial access-search at the dominant edge device (and also the one or more UEs 106) when the cellular connectivity of the dominant edge device in motion is predicted to become less than the threshold performance value so that the one or more UEs 106 may be serviced by the dominant edge device (e.g., the first edge device 112A) to continue with mmWave connection with the least amount of service disruption.

In accordance with an embodiment, the processor 202 may be further configured to detect a deviation from the travel path based on the sensing information 208 obtained periodically from the first edge device 112A and the second edge device 112B. For instance, if the last obtained sensing information indicates that the current location of the first edge device 112A or the moving direction is not in conformity with the last predicted travel path, the processor 202 may detect the deviation from the travel path. The processor 202 may be further configured to re-determine an updated set of alternative wireless connectivity options to be made available to the first edge device 112A and the second edge device 112B in motion in advance for the detected deviation in the travel path based on the connectivity enhanced database 216 and the detected deviation in the previously predicted travel path.

Currently, it is observed that a smartphone battery, such as a battery of the first UE 106A and the second UE 106B, may drain faster when it switched from 4G radio access to 5G back and forth. In mobility scenarios, for example, when the one or more UEs 106, such as the first UE 106A and the second UE 106B, are present in a moving vehicle like the vehicle 116N, the battery of such UEs drains even faster. Thus, in this case, as the one or more UEs 106 are serviced by the determined dominant edge device, which employs the battery of the vehicle 116N, for its operation, the drainage in the comparatively smaller sized and low-capacity batteries of the one or more UEs 106 is significantly reduced, whereas the performance of the one or more UEs 106, is significantly improved (e.g., almost tripled or quadrupled) at least in terms of data throughput at the one or more UEs 106. An example of the performance results can be further understood, for example, from FIGS. 4A to 4C.

Figure 3A:
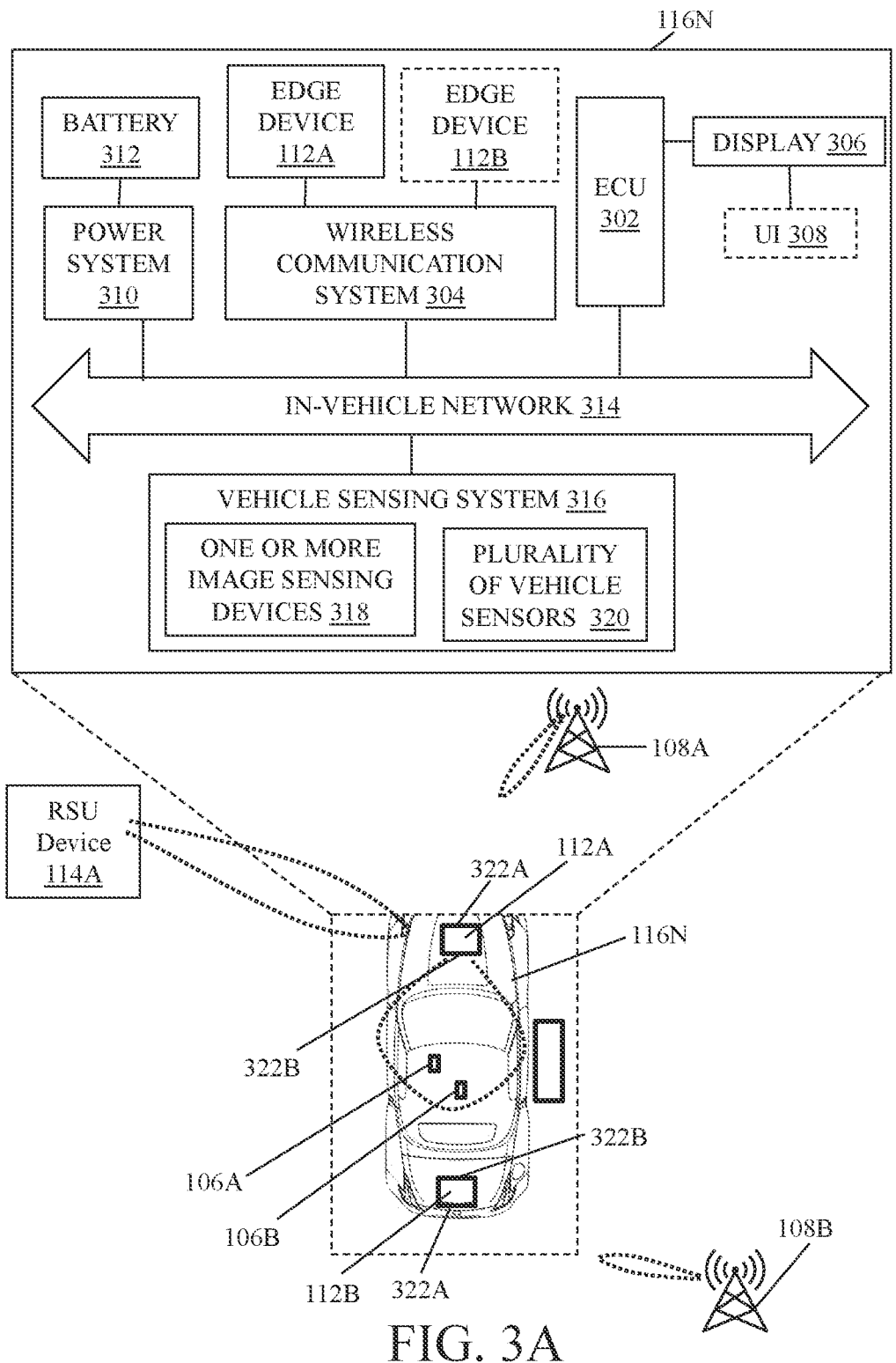
FIG. 3A is a diagram illustrating an exemplary arrangement of one or more edge devices on a vehicle with exemplary components, in accordance with an embodiment of the disclosure.

FIG. 3A is a diagram illustrating an exemplary arrangement of one or more edge devices on a vehicle with exemplary components, in accordance with an embodiment of the disclosure. FIG. 3A is explained in conjunction with elements from FIGS. 1, 2, and 3. With reference to FIG. 3A, there is shown the vehicle 116N with the first edge device 112A and the second edge device 112B, the RSU device 114A, the first base station 108A and the second base station 108B. The vehicle 116N may include an electronic control unit (ECU) 302 and a wireless communication system 304 coupled to the one or more edge devices, such as the edge devices 112A and the 112B, arranged at the vehicle 116N. There is further shown a display 306, a user interface 308, a power system 310, a battery 312, an in-vehicle network 314, and a vehicle sensing system 316 that may include one or more image sensing devices 318 and a plurality of vehicle sensors 320.

In some implementations, two edge devices, such as the first edge device 112A and the second edge device 112B, may be arranged at the vehicle 116N. In such a case, the first edge device 112A and the second edge device 112B may be arranged at different positions on the vehicle 116N. In an example, the first edge device 112A may be arranged at the front of the vehicle 116N, whereas the second edge device 112B may be arranged at the rear of the vehicle 116N. The front and rear may be ascertained based on a driving area and rear passenger area, respectively. In another example, the first edge device 112A may be arranged at a first side (e.g., a left door side) of the vehicle 116N, whereas the second edge device 112B may be arranged at a second side (e.g., a right door side) opposite to the first side of the vehicle 116N, as shown. The left and right of the vehicle 116N may be ascertained from a perspective of a user standing at the rear of the vehicle 116N and viewing the vehicle 116N from the rear side while the vehicle 116N may be moving ahead and away from the user.

A service side 322B of the first edge device 112A may be arranged to service components of the vehicle 116N and UEs, such as the first UE 106A and the second UE 106B associated with the vehicle 116N. The components of the vehicle 116N, which may be serviced, for example, include the wireless communication system 304 to establish and maintain wireless connectivity for data communication to and from the vehicle 116N. In some implementations, one or more edge devices, such as the first edge device 112A and the second edge device 112B, may be a part of a telematics unit (i.e., the wireless communication system 304) of the vehicle 116N. In yet another example, one or more edge devices, such as the first edge device 112A and the second edge device 112B, may be adapted to form a housing of the side mirrors of the vehicle 116N. It is to be understood to a person of ordinary skill in the art that there may be more than one or two edge devices and their arrangement at the vehicle 116N may vary as long as such edge devices are able to receive and transmit RF signals to the one or more network nodes, such as one or more base stations (e.g., the first base station 108A or the second base station 108B) and one or more RSU devices (e.g., the RSU device 114A).

The ECU 302 may comprise suitable logic, circuitry, interfaces, and/or instructions that may be configured to execute operations for acquiring and processing sensor data captured by the vehicle sensing system 316. The various components or systems of the vehicle 116N may be communicatively coupled to each other via the in-vehicle network 314, such as a vehicle area network (VAN), and/or an in-vehicle data bus. The wireless communication system 304 may include or may be communicatively coupled with the edge devices (e.g., the first edge device 112A and the second edge device 112B) to communicate with one or more external communication devices, such as the central cloud server 102, one or more inference servers of the plurality of inference servers 118, one or more other network nodes (e.g., RSU devices and base stations), and one or more other vehicles. The display 306 may be communicatively coupled to the ECU 302 and may be a display of an infotainment head unit, which may render the UI 308 configured to receive an input from a user to activate the one or more edge devices, such as the edge devices 112A and 112B. Other examples of the display 306 may include, but are not limited to, a heads-up display (HUD), a driver information console (DIC), a smart-glass display, and/or an electrochromic display. The power system 310 may be configured to measure and regulate the availability and distribution of uninterrupted power from the battery 312 to various electric circuits and loads of the first vehicle 702, for example, the first edge device 112A and the second edge device 112B. The vehicle sensing system 316 may comprise the one or more image sensing device 318 and the plurality of vehicle sensors 320 installed at the vehicle 116N. The one or more image sensing device 318 may be configured to capture a field-of-view (FOV) of a surrounding area of the vehicle 116N. Examples of the plurality of vehicle sensors 320 may include, but may not be limited to, a vehicle speed sensor, an odometer, a yaw rate sensor, a speedometer, a Global Navigation Satellite System (GNSS) receiver (e.g., a GPS), a steering angle detection sensor, a vehicle motion direction detection sensor, a magnetometer, an infrared sensor, a radio wave-based object detection sensor, and/or a laser-based object detection sensor. The plurality of vehicle sensors 320 may be configured to further detect a direction of travel, geospatial position, steering angle, yaw rate, speed, and/or a rate-of-change of speed of the vehicle 116N.

In operation, in the training phase, the one or more edge devices, such as the first edge device 112A and the second edge device 112B, may be configured to capture sensing information of a surrounding of the vehicle 116N. The one or more edge devices, such as the first edge device 112A and the second edge device 112B, may be configured to utilize the vehicle sensing system 316 to acquire sensor data and communicate as such the sensor data as the sensing information 208 to the central cloud server 102. In an implementation, the one or more edge devices, such as the first edge device 112A and the second edge device 112B, may be configured to selectively filter such sensor data from the vehicle sensing system 316 to extract relevant features as the sensing information 208 before sending to the central cloud server 102 in the training phase. For example, features such as a location of a vehicle, a moving direction, a travel path, speedometer readings or a rate of change of speed, an orientation, a time-of-day, traffic light information, nearby bridges, weather information, a presence of reflective objects, etc., may be extracted from the sensor data of the vehicle sensing system 316 and periodically communicated as the sensing information 208 to the central cloud server 102. The one or more edge devices, such as the first edge device 112A and the second edge device 112B, may be further configured to periodically communicate the processing chain parameters 210 to the central cloud server 102. All such measurements and feedback are sent to the central cloud server 102 for learning. The sensing information 208, the processing chain parameters 210 of the first edge device 112A and the second edge device 112B, and the position information 212 associated with the vehicle 116N and other vehicles of the plurality of vehicles 116 may be correlated by the central cloud server 102 to generate the connectivity enhanced database 216 holistically for the plurality of different WCNs 110.

In the inference phase, in an implementation, the two edge devices, such as the first edge device 112A and the second edge device 112B, may be configured to receive an activation request to activate the two edge devices. The request may be received from the first UE 106A or via the in-vehicle network 314 based on input via the UI 308. The activation request may be received via an out-of-band communication, such as WI-FI™, BLUETOOTH™, a personal area network (PAN) connection, or via the in-vehicle network 314. The two edge devices (i.e., the first edge device 112A and the second edge device 112B) may be further configured to communicate new sensing information to the inference server 118A of the plurality of inference servers 118 (or to the central cloud server 102). Due to the awareness of a physical location of the two edge devices (i.e., the first edge device 112A and the second edge device 112B) and the new sensing information (most recent), the central cloud server 102 (either directly or via the inference server 118A) may be configured to transmit wireless connectivity enhanced information that includes specific initial access information to each of the two edge devices (i.e., the first edge device 112A and the second edge device 112B). The specific initial access information may be used by each of the two edge devices (i.e., the first edge device 112A and the second edge device 112B) to bypass an initial access search and further switch (i.e., become attached) to a same or a corresponding base station (e.g., a new gNB) with reduced latency as compared to standard gNB handover time when the vehicle 116N moves along a first geographical area of the plurality of geographical areas along the travel path. The two edge devices (i.e., the first edge device 112A and the second edge device 112B) may be communicatively coupled with each other via a communication path which may be wired or wireless.

The processor 202 of the central cloud server 102 (or the ECU 302 in an implementation) upon discovering when both the first edge device 112A and the second edge device 112B (i.e., both the repeater #1 and repeater #2) have the active synch path, is able to elect the dominant edge device in terms of RSRP and SNR and may purposefully enfeeble the non-dominant edge device (e.g., weaken its Tx power) that was acting as the noise source. Moreover, each of the first edge device 112A and the second edge device 112B may have a donor side (hereinafter simply referred to as a donor) and a relay side (or service side, hereinafter referred to as a relay). The non-dominant edge device may be enfeebled (i.e., weakened) altering the receive signal power of the donor and transmit signal power of relay. This triggers signal re-acquisition process at the one or more UEs 106 previously connected to a respective base station via the non-dominant repeater and the one or more UEs 106 may be soft handed (e.g., handover in microseconds) to the dominant edge device. For instance, at least the first UE 106A of the one or more UEs 106 may be previously attached to the second base station 108B via the non-dominant edge device. The enfeeblement of the non-dominant edge device triggers a signal re-acquisition process at least at the first UE 106A and the first UE 106A may be soft handed to the dominant edge device to cause an increase in a data throughput rate at least at the first UE 106A. Alternatively stated, the central cloud server 102 may cause the first edge device 112A and second edge device 112B to alter gains of the donor Rx path and the relay Tx path in a manner that beam properties may not be lost but certain gain adjustments may be made to cause the active synch path to be broken. This automatically triggers the internal beam scanning and re-acquisition process at the one or more UEs 106, which may be then readily satisfied by adjusting the gains of the dominant edge device. Thus, the one or more UEs 106 may then begin a signal integrity check and complete their arbitration with the new base station (i.e., a new gNB) (e.g., the first base station 108A) connected via the dominant edge device (e.g., the first edge device 112A). Thus, the performance of the one or more UEs 106 may be altered (improved) by intentionally weakening a signal of the non-dominant edge device that is either degrading or there is a better pairing possible with the dominant edge device. This knowledge of the dominant edge device and non-dominant edge device may be driven from the central cloud server 102 and when cloud ML (i.e., the machine learning model 214) comes to this inference of the dominant edge device and the non-dominant edge device, it instructs the edge connection management (i.e., the vehicle connection manager) to make appropriate signal strength modifications such that the one or more UEs 106 swiftly roams to the dominant edge device (i.e., the best repeater). This usually occurs in microseconds, and hence called soft handover.

Currently, it is observed that a smartphone battery, such as a battery of the first UE 106A and the second UE 106B, drains faster when it switched from 4G radio access to 5G back and forth. In mobility scenarios, for example, when such UEs, such as the first UE 106A and the second UE 106B, are present in a moving vehicle like the vehicle 116N, the battery of such UEs drains even faster. Thus, in this case, as the UEs are serviced by the dominant edge device, present in the vicinity, which in the employ the battery 312 of the vehicle 116N, for its operation, the drainage in the comparatively smaller sized and low-capacity batteries of the UEs is significantly reduced.

In an implementation, as the travel path is predicted by the central cloud server 102 and/or the inference server 118A, the central cloud server 102 (or the inference server 118A) may be configured to communicate not only the primary wireless connectivity option (i.e., the optimized initial access information, e.g., best beam index, best beam configuration, best ARFCN, and PCID), but also provides the set of alternative wireless connectivity options (a set of alternative initial access information in advance) to the one or more edge devices, such as the first edge device 112A and the second edge device 112B. These set of alternative wireless connectivity options may be used as fallback options which can be readily used to connect to a new gNB. For example, based on learned information (associated with different locations across the plurality of geographical areas of the travel path) in the connectivity enhanced database 216, the central cloud server 102 (or the inference server 118A) may be further configured to predict that three different initial access information may be required for the travel path based on the predicted travel path and based on other supplementary information, such as real-time or near real-time traffic information and road information, for example, the location of turns, street cross-sections, an occurrence of any bridge, surrounding buildings that may block signals at certain road portion of the travel path. Thus, accordingly, the central cloud server 102 (or the inference server 118A) may extract such a set of initial access information and communicate to the one or more edge devices, such as the first edge device 112A and the second edge device 112B. In one implementation, the one or more edge devices, such as the first edge device 112A and the second edge device 112B, based on its current position in the travel path, may retrieve corresponding initial access information from the set of initial access information in accordance with its position and maintain wireless connectivity with multiple handovers (e.g., three handovers in this case). For instance, the vehicle 116N may be move 10 minutes, and then a first initial access information may be triggered for use based on its current position. The vehicle 116N may further move 20 minutes along the travel path and due to some signal disruption (like a temporary signal loss), a second initial access information is triggered for use from the set of initial access information. Lastly, a third initial access information is triggered for use at the last 5 minutes of completion of the travel path based on the updated position of the vehicle 116N. Beneficially, this increases the reliability and maintains high data throughput rate throughout the travel path without any adverse interruptions. Alternatively, in another implementation, one or more alternative wireless connectivity options from the set of alternative wireless connectivity options are triggered at a given location or a geographical area when the primary wireless connectively options fails.

Figure 3B:
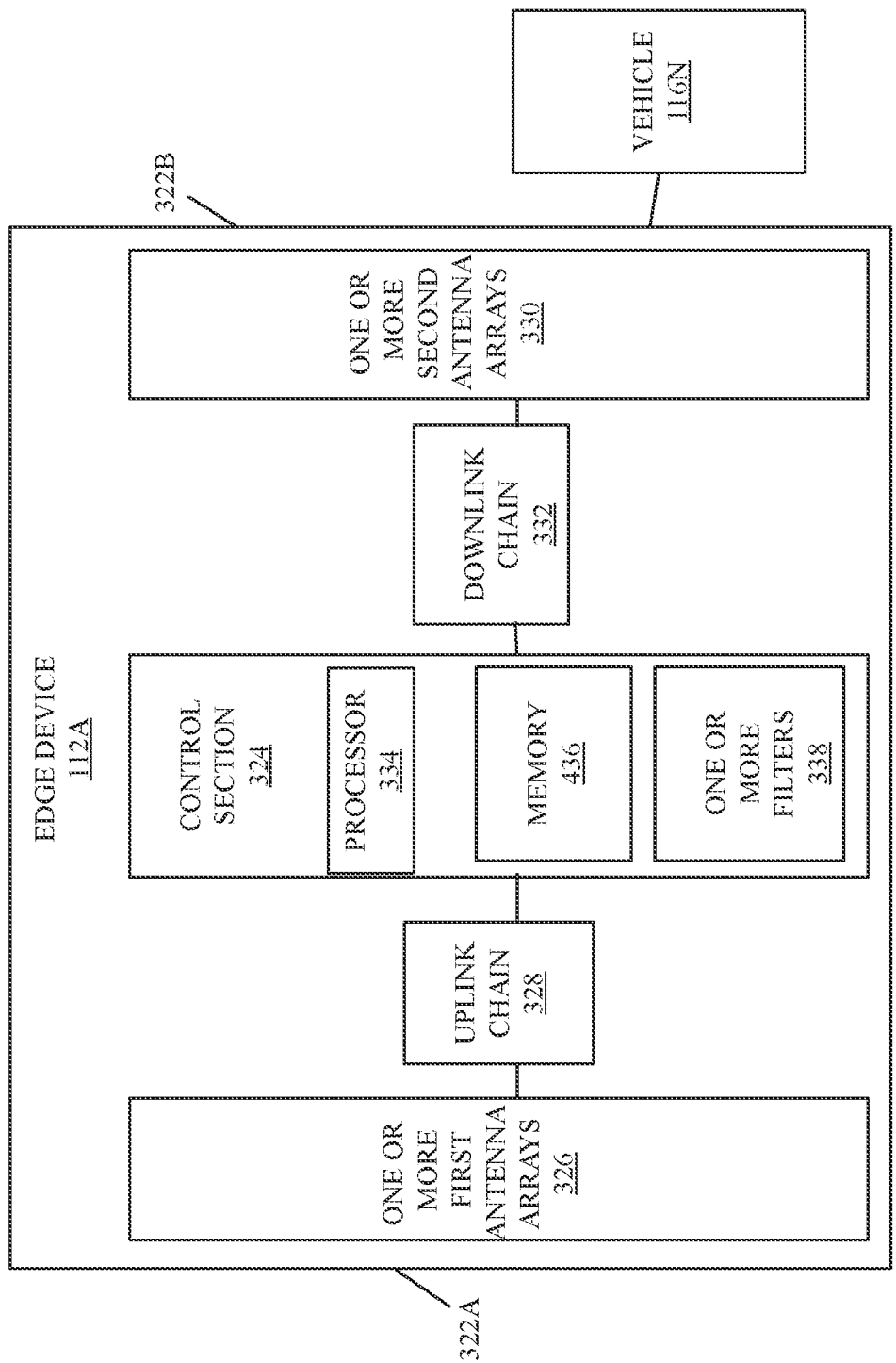
FIG. 3B is a block diagram illustrating components of an exemplary edge device arranged on a vehicle, in accordance with an embodiment of the disclosure.

FIG. 3B is a block diagram illustrating components of an exemplary edge device arranged on a vehicle, in accordance with an embodiment of the disclosure. FIG. 3B is explained in conjunction with elements from FIGS. 1, 2, and 3A. With reference to FIG. 3B, there is shown a block diagram 300 of an edge device, such as the first edge device 112A. The first edge device 112A has the donor side 322A facing one or network nodes, such as one or more base stations and one or more RSU devices, such as the RSU device 114A. The first edge device 112A also has the service side 322B facing towards an interior of the vehicle 116N. The second edge device 112B and other edge devices of the first type of edge devices 104A may be similar to that of first edge device 112A. In an implementation, the first edge device 112A may include components that are similar to that of the RSU device 114A. For instance, the first edge device 112A may include a control section 324 and a front-end radio frequency (RF) section, which may include one or more first antenna arrays 326 and an uplink chain 328 at the donor side 322A, and further one or more second antenna arrays 330 and a downlink chain 332 at the service side 322B. The control section 324 may be communicatively coupled to the front-end RF section, such as the one or more first antenna arrays 326, the uplink chain 328, the one or more second antenna arrays 330, and the downlink chain 332. The front-end RF section supports millimeter-wave (mmWave) communication as well communication at a sub 6 gigahertz (GHz) frequency. The control section 324 may further include a processor 334, a memory 336, and one or more filters 338.

The first edge device 112A is one of the first type of edge devices 104A, which is a movable device. Thus, the donor side 322A of the first edge device 112A is more active in terms of handling handovers and changes in a channel as compared to the service side.

In operation, the processor 334 may be configured to capture sensing information at first edge device 112A and the second edge device 112B and surrounding area of the first edge device 112A and the second edge device 112B. Each of the first edge device 112A and the second edge device 112B may be configured to capture sensing information of its own sensors (such as location sensor (e.g., GPS) or other sensors) as well as utilize the vehicle sensing system 316 to acquire sensor data and communicate as such the sensor data as the sensing information 208 to the central cloud server 102. For example, features such as a location of a vehicle, a moving direction, a travel path, speedometer readings or a rate of change of speed, an orientation, a time-of-day, traffic light information, nearby bridges, weather information, a presence of reflective objects, etc., may be extracted from the sensor data of the vehicle sensing system 316 and periodically communicated as the sensing information 208 to the central cloud server 102.

In accordance with an embodiment, each of the first edge device 112A and the second edge device 112B may be configured to establish an active sync path with a RAN node. Each of the first edge device 112A and the second edge device 112B may be further configured to receive an instruction from the central cloud server 102. The instruction may indicate which of the first edge device 112A and the second edge device 112B is a dominant edge device and a non-dominant edge device. The non-dominant edge device may then be configured to enfeeble itself by at least by reducing transmit signal power based on the instruction received from the central cloud server 102. At least the first UE 106A of the one or more UEs 106 may be previously connected to the RAN node via the non-dominant edge device. The enfeeblement of the non-dominant edge device triggers a signal re-acquisition process at least at the first UE 106A and the first UE 106A may be soft handed to the dominant edge device to cause an increase in a data throughput rate at least at the first UE 106A.

In accordance with an embodiment, each of the first edge device 112A and the second edge device 112B may be further configured to obtain a plurality of alternative wireless connectivity options from the central cloud server 102 for upcoming locations along the travel path. Each of the plurality of alternative wireless connectivity options may comprise a different specific initial access information. The dominant edge device may be further configured to select one or more alternative wireless connectivity options from the plurality of alternative wireless connectivity options at one or more upcoming locations along the travel path when the primary wireless connectivity option fails or when a cellular connectivity of the dominant edge device to the first base station 108A via a primary wireless connectivity option is about to become less than a threshold performance value. The selected one or more alternative wireless connectivity options causes the dominant edge device to bypass an initial access-search and maintain the cellular connectivity with at least one of the plurality of base stations 108. Since there are instances when the control channel may be briefly lost, for example, when there is a signal obstruction due to a tunnel, or while traveling in some remote areas where coverage is sparse. In such cases, one or more alternative wireless connectivity options from the set of alternative wireless connectivity options may be configured to be triggered along the predicted travel path to maintain continuous 5G connectivity for enhanced QoE.

Figure 4A:
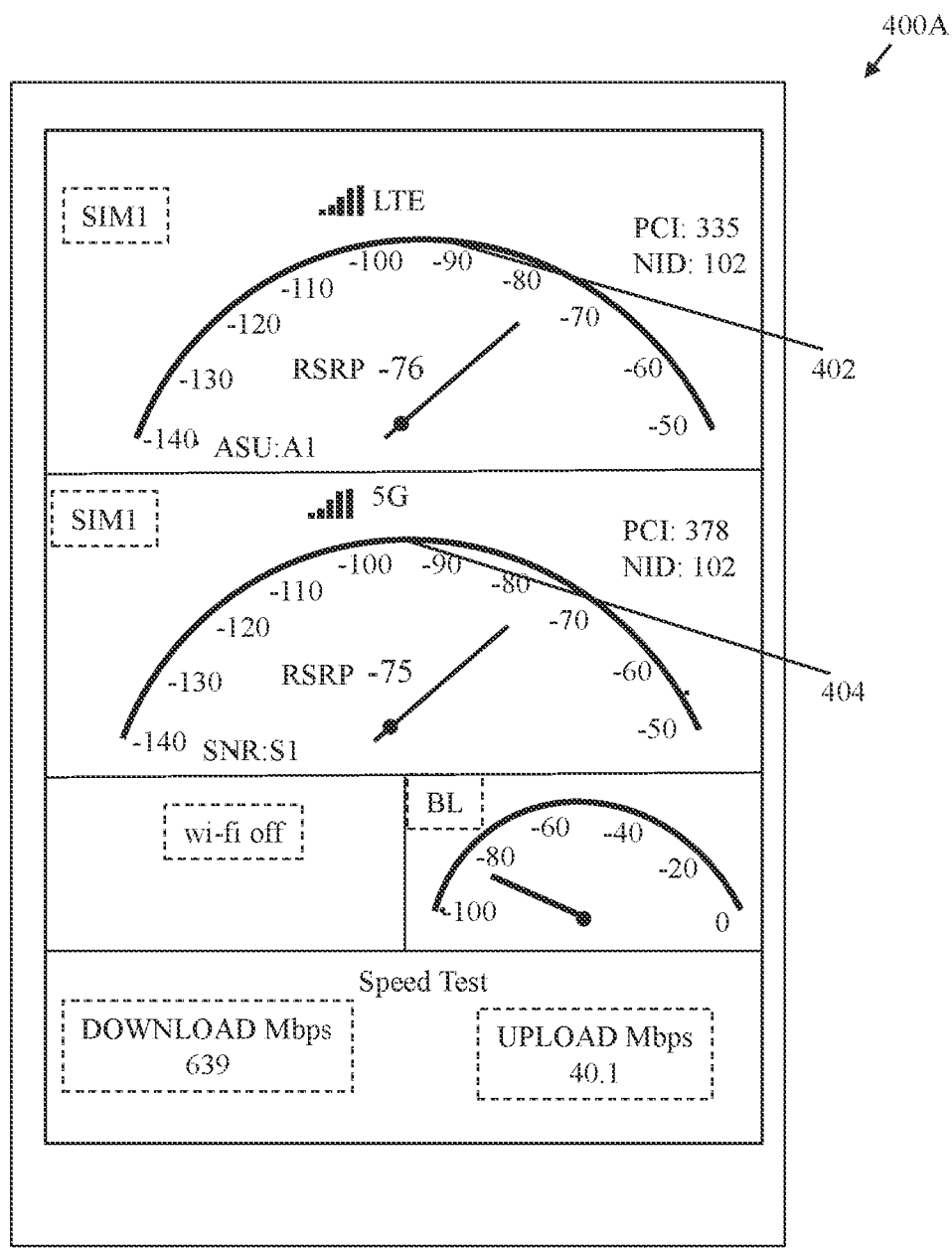
FIGS. 4A, 4B, and 4C are diagrams illustrating exemplary scenarios for implementation of the communication system and method for controlling cooperation between edge devices arranged in vehicle for high-performance communication, in accordance with an embodiment of the disclosure.
Figure 4B:
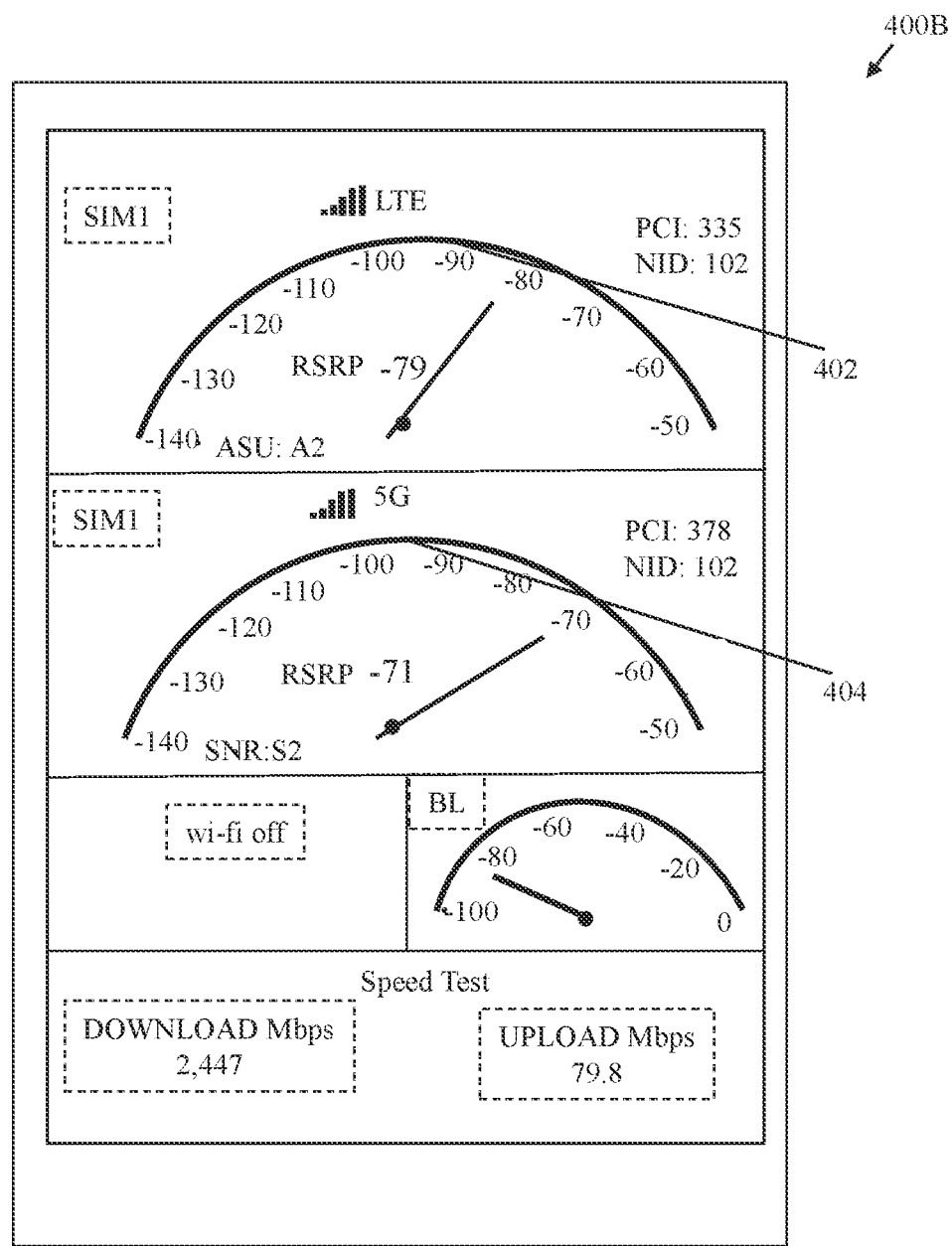
Figure 4C:
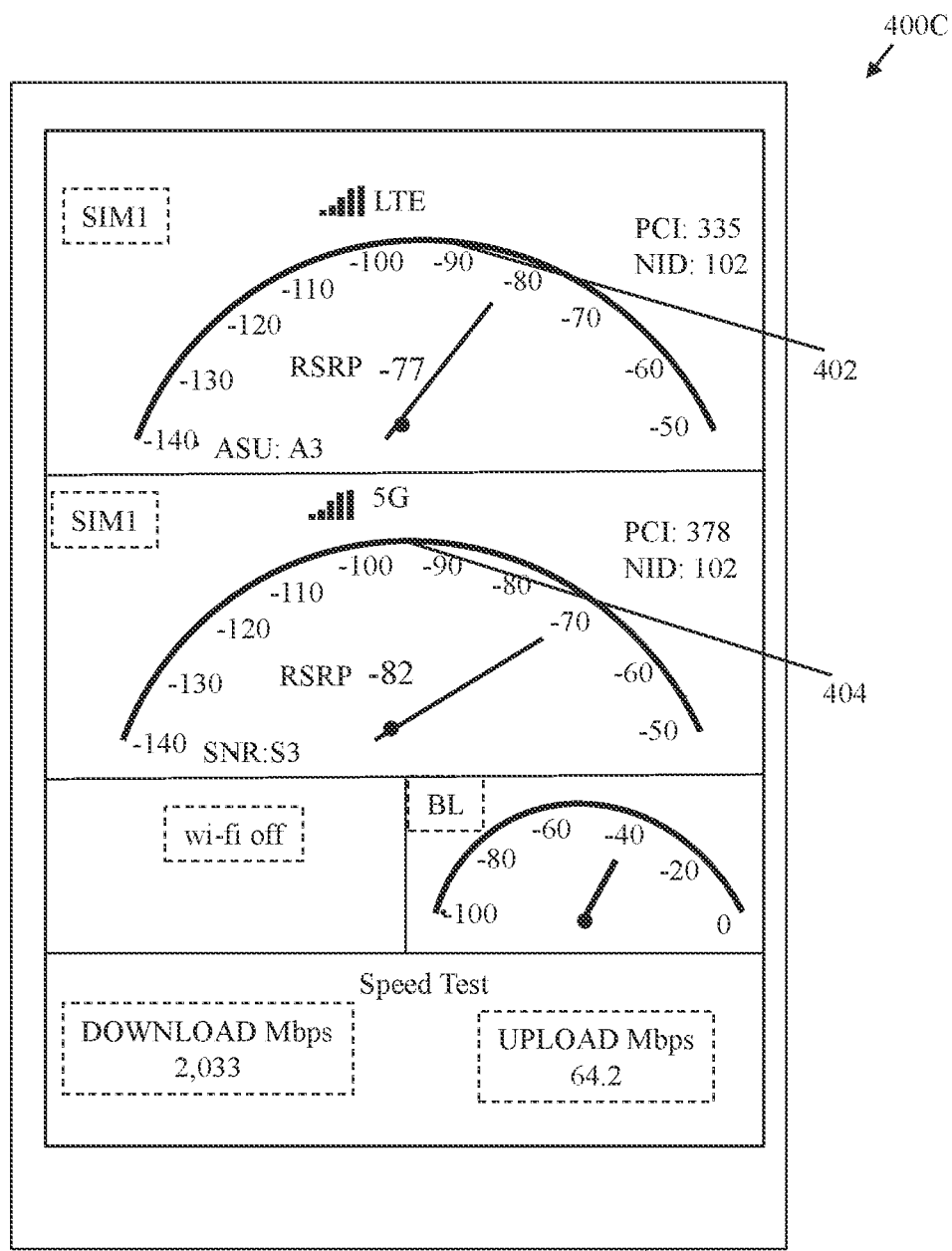

FIGS. 4A, 4B, and 4C illustrate exemplary scenarios for implementation of the communication system and method for controlling cooperation between edge devices arranged in vehicle for high-performance communication, in accordance with an embodiment of the disclosure. FIGS. 4A, 4B, and 4C are explained in conjunction with elements from FIGS. 1, 2, 3A, and 3B. With reference to the FIGS. 4A, there is shown a first exemplary scenario 400A that depicts test results of performance of the first UE 106A, such as a smartphone, when each of the first edge device 112A (FIG. 1) arranged at the first location of the vehicle 116A (FIG. 1) and the second edge device 112B (FIG. 1) arranged at the second location of the vehicle 116A have an active sync path. A first graph element 402 shows a connection strength of a sub-6 frequency anchor i.e., to an eNB or FR1 frequency of 5G NR, where the eNB may have a first PCI (e.g., PCI: 335 in this example). A second graph element 404 shows a connection strength of a mmWave channel to a gNB or FR2 frequency of 5G NR, where the gNB may have a second PCI (e.g., PCI: 378 in this example), and the first UE 106 may be connected to the gNB via the first edge device 112A or the second edge device 112B.

The first edge device 112A may be connected to the base station 1 (e.g., the PCI 335) and the second edge device 112B may be connected to base station 2 (e.g., the PCI 378).

Both the first edge device 112A and the second edge device 112B may be independently controlled from the central cloud server 102, and each of the edge devices may have an LTE modem too. In the FIG. 4A, a cellular connectivity of the first UE 106A is shown, where the first UE 106A may have a call (i.e., one connection) anchored on LTE/4G or FR1 or frequency range 1. Based on a proximity of a mmWave small cell, there may be a direct signaling between the first UE 106A and a gNB via the first edge device 112A. The connection parameters may be arbitrated via radio resource management (RRM) messages and a mmWave (FR2) sync path may be established. Once this path is established, the macro cell or the eNB and the small cell or the gNB may be aware of this transition at the first UE 106A. Thus, the first UE 106A shows both the status of FR1 and FR2 signal via the first graph element 402 and the second graph element 404, respectively. The WI-FI™ may be OFF, and "BL" represents BLUETOOTH™ connectivity.

There is further shown speed test, which indicates download speed of 639 Mbps and upload speed of 40.1 Mbps in an example, which is low, not as expected and not desirable. Such low performance is because of the active sync path at the first edge device 112A and the second edge device 112B. Thus, it is observed that a received signal power (such as Reference Signal Received Power (RSRP)) of the first UE 106A present in the vehicle 116A in motion generally remain greater than a threshold (i.e., a smartphone's RSRP may remain strong), however, an effective throughput in a communication system degrades significantly.

With reference to the FIG. 4B, there is shown a second exemplary scenario 400B that depicts test results of performance of the first UE 106A, such as a smartphone, when the first edge device 112A may be elected as the dominant edge device and only the first edge device 112A elected as the dominant edge device has the active sync path. There is shown the first graph element 402 and the second graph element 404 showing corresponding connection strength almost similar to that of the FIG. 4A. There is further shown speed test, which indicates significant improvement in data throughput, for example, download speed of 2447 Mbps and upload speed of 79.8 Mbps, as compared to FIG. 4A in this example.

With reference to the FIG. 4C, there is shown a third exemplary scenario 400C that depicts test results of performance of the first UE 106A, such as a smartphone, when the second edge device 112B may be dynamically elected as the dominant edge device at a later time point and only the second edge device 112B elected as the dominant edge device has the active sync path. There is shown the first graph element 402 and the second graph element 404 showing corresponding connection strength with slight variation as compared to FIG. 4A and FIG. 4B. However, there is further shown speed test, which indicates significant improvement in data throughput, for example, download speed of 2033 Mbps and upload speed of 64.2 Mbps, as compared to FIG. 4A in this example.

Figure 5A:
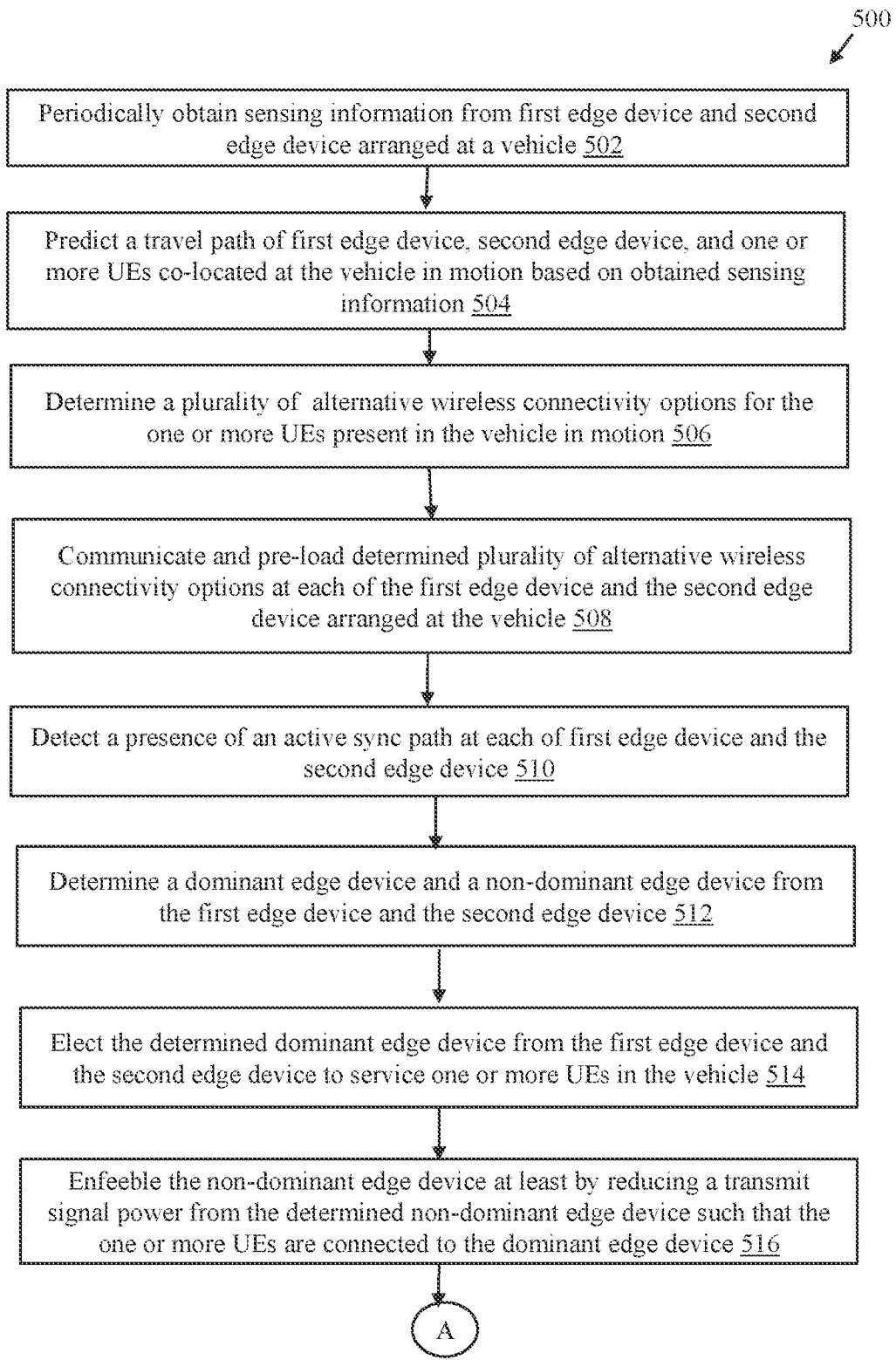
FIGS. 5A and 5B collectively is a flowchart that illustrates an exemplary method for controlling cooperation between edge devices arranged in vehicle for high-performance communication in mobility applications, in accordance with another embodiment of the disclosure.
Figure 5B:
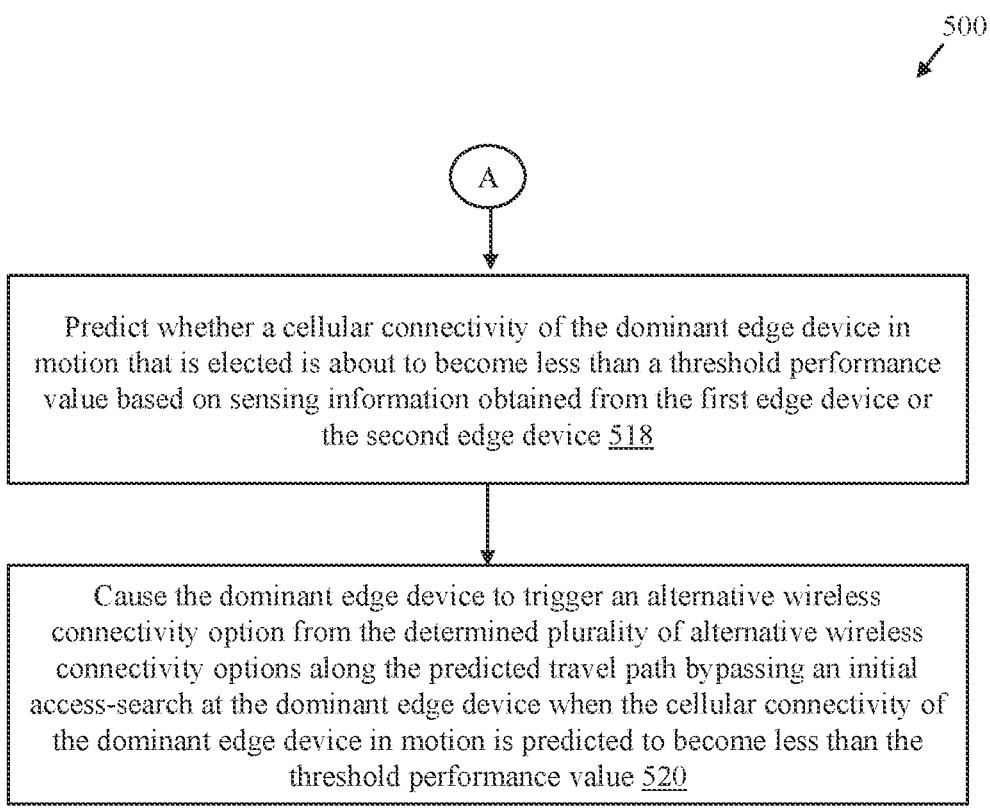

FIGS. 5A and 5B collectively is a flowchart 500 that illustrates an exemplary method for controlling cooperation between edge devices arranged in vehicle for high-performance communication in mobility applications, in accordance with another embodiment of the disclosure. FIG. 5 is explained in conjunction with elements from FIGS. 1, 2, 3A, 3B, 4A to 4C. With reference to FIG. 5, there is shown a flowchart 500 comprising exemplary operations 502 through 520. The operations of the method depicted in the flowchart 500 may be implemented in the central cloud server 102 (FIGS. 1 and 2).

At 502, sensing information may be periodically obtained from the first edge device 112A and the second edge device 112B arranged at the vehicle (e.g., the vehicle 116N).

At 504, a travel path of the first edge device 112A, the second edge device 112B, and one or more UEs 106 co-located at the vehicle (e.g., the vehicle 116N) in motion may be predicted based on obtained sensing information.

At 506, a plurality of alternative wireless connectivity options may be determined for the one or more UEs 106 present in the vehicle (e.g., the vehicle 116N) in motion or for the first edge device 112A and the second edge device 112B.

At 508, the determined plurality of alternative wireless connectivity options may be communicated and pre-loaded at each of the first edge device 112A and the second edge device 112B arranged at the vehicle (e.g., the vehicle 116N) to reduce (i.e., minimize) signaling latency between a corresponding source network node and at least one of the first edge device 112A or the second edge device 112B.

At 510, a presence of an active sync path may be detected at each of the first edge device 112A and the second edge device 112B. The first edge device 112A may be arranged at a first location at the vehicle (e.g., the vehicle 116N) and the second edge device 112B may be arranged at a second location of the vehicle (e.g., the vehicle 116N).

At 512, a dominant edge device and a non-dominant edge device from the first edge device 112A and the second edge device 112B may be determined.

At 514, the determined dominant edge device may be elected from the first edge device 112A and the second edge device 112b to service one or more UEs 106 in the vehicle (e.g., the vehicle 116N).

At 516, the non-dominant edge device may be enfeebled (e.g., weakened) at least by reducing a transmit signal power from the determined non-dominant edge device such that the one or more UEs 106 are connected to the dominant edge device.

At 518, it is predicted whether a cellular connectivity of the dominant edge device in motion that is elected is about to become less than a threshold performance value based on sensing information obtained from the first edge device 112A or the second edge device 112B.

At 520, the dominant edge device may be caused to trigger an alternative wireless connectivity option from the determined plurality of alternative wireless connectivity options along the predicted travel path bypassing an initial access-search at the dominant edge device when the cellular connectivity of the dominant edge device in motion is predicted to become less than the threshold performance value.

Various embodiments of the disclosure may provide a non-transitory computer-readable medium having stored thereon, computer-implemented instructions that when executed by a computer causes the computer to execute operations that comprise detecting a presence of an active sync path at each of the first edge device 112A and the second edge device 112B, where the first edge device 112A is arranged at a first location at a vehicle (e.g., the vehicle 116N) and the second edge device 112B is arranged at a second location of the vehicle. The operations further comprise determining a dominant edge device and a non-dominant edge device from the first edge device 112A and the second edge device 112B. The operations further elect the determined dominant edge device from the first edge device 112A and the second edge device 112B to service one or more UEs 106 in the vehicle (e.g., the vehicle 116N).

Various embodiments of the disclosure may include a central cloud server 102 (FIG. 1). The central cloud server 102 comprises the processor 202 configured to detect a presence of an active sync path at each of the first edge device 112A and the second edge device 112B, where the first edge device 112A is arranged at a first location at a vehicle (e.g., the vehicle 116N) and the second edge device 112B is arranged at a second location of the vehicle. The processor 202 may be further configured to determine a dominant edge device and a non-dominant edge device from the first edge device 112A and the second edge device 112B. The processor 202 may be further configured to elect the determined dominant edge device from the first edge device 112A and the second edge device 112B to service one or more UEs 106 in the vehicle (e.g., the vehicle 116N).

While various embodiments described in the present disclosure have been described above, it should be understood that they have been presented by way of example and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g., computer readable code, program code, and/or instructions disposed in any form, such as source, object, or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory or any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microcontroller (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:
1. A communication system, comprising:
a central cloud server that comprises a processor, wherein the processor is configured to:
detect a presence of an active sync path at each of a first edge device and a second edge device, wherein the first edge device is arranged at a first location at a vehicle and the second edge device is arranged at a second location of the vehicle;

determine a dominant edge device and a non-dominant edge device from the first edge device and the second edge device;

elect the determined dominant edge device from the first edge device and the second edge device to service one or more user equipment (UEs) in the vehicle; and enfeeble the non-dominant edge device at least by reducing a transmit signal power from the determined non-dominant edge device.

2. The communication system according to claim 1, wherein at least a first UE of the one or more UEs is connected to a radio access network (RAN) node via the non-dominant edge device, and wherein the enfeeblement of the non-dominant edge device triggers a signal re-acquisition process at least at the first UE and the first UE is soft handed to the dominant edge device to cause an increase in a data throughput rate at least at the first UE, and wherein the RAN node is one of: a base station, a small cell, or a road side unit (RSU) device.

3. The communication system according to claim 1, wherein each of the first edge device and the second edge device is an XG-enabled repeater device, and wherein the one or more UEs corresponds to at least one of: an XG-enabled smartphone, an in-vehicle infotainment system, or an XG-enabled in-vehicle device or other vehicle device, wherein the XG corresponds to a 5G or a 6G radio access communication.

4. The communication system according to claim 1, wherein the processor is further configured to periodically obtain sensing information from the first edge device and the second edge device arranged at the vehicle.

5. The communication system according to claim 4, wherein the processor is further configured to predict a travel path of the first edge device, the second edge device, and the one or more UEs are co-located at the vehicle in motion based on the periodically obtained sensing information.

6. The communication system according to claim 1, wherein the processor is further configured to determine a plurality of alternative wireless connectivity options for the one or more UEs present in the vehicle in motion or for the first edge device and the second edge device.

7. The communication system according to claim 6, wherein the processor is further configured to communicate and pre-load the determined plurality of alternative wireless connectivity options at each of the first edge device and the second edge device arranged at the vehicle to reduce signaling latency between a corresponding source network node and at least one of the first edge device or the second edge device.

8. The communication system according to claim 6, wherein each of the determined plurality of alternative wireless connectivity options comprises a different and specific initial access information.

9. The communication system according to claim 6, wherein the processor is further configured to predict whether a cellular connectivity of the dominant edge device in motion that is elected is about to become less than a threshold performance value based on sensing information obtained from the first edge device or the second edge device.

10. The communication system according to claim 9, wherein the processor is further configured to cause the dominant edge device to trigger an alternative wireless connectivity option from the determined plurality of alternative wireless connectivity options along a predicted travel path bypassing an initial access-search at the dominant edge device when the cellular connectivity of the dominant edge device in motion is predicted to become less than the threshold performance value.

11. The communication system according to claim 1, wherein the processor is further configured to reduce the battery consumption of one or more UEs based on the connection of the one or more UEs with the dominant edge device.

12. A method for controlling cooperation between edge devices arranged in a vehicle, the method comprising:

detecting, by a processor, a presence of an active sync path between a first edge device and a second edge device, wherein the first edge device is arranged at a first location at the vehicle and the second edge device is arranged at a second location of the vehicle;

determining, by the processor, a dominant edge device and a non-dominant edge device from the first edge device and the second edge device;

electing, by the processor, the determined dominant edge device from the first edge device and the second edge device to service one or more user equipment (UEs) in the vehicle; and enfeebling, by the processor, the non-dominant edge device at least by reducing a transmit signal power from the determined non-dominant edge device.

13. The method according to claim 12, wherein at least a first UE of the one or more UEs is connected to a radio access network (RAN) node via the non-dominant edge device, and wherein the enfeebling of the non-dominant edge device triggers a signal re-acquisition process at least at the first UE and the first UE is soft handed to the dominant edge device to cause an increase in a data throughput rate at least at the first UE, and wherein the RAN node is one of: a base station, a small cell, or a road side unit (RSU) device.

14. The method according to claim 12, further comprising periodically obtaining, by the processor, sensing information from the first edge device and the second edge device arranged at the vehicle.

15. The method according to claim 14, further comprising predicting, by the processor, a travel path of the first edge device, the second edge device, and the one or more UEs co-located at the vehicle in motion based on the periodically obtained sensing information.

16. The method according to claim 12, further comprising determining, by the processor, a plurality of alternative wireless connectivity options for the one or more UEs present in the vehicle in motion or for the first edge device and the second edge device.

17. The method according to claim 16, further comprising communicating, by the processor, the determined plurality of alternative wireless connectivity options at each of the first edge device and the second edge device arranged at the vehicle to reduce signaling latency between a corresponding source network node and at least one of the first edge device or the second edge device.

18. The method according to claim 16, further comprising predicting, by the processor, whether a cellular connectivity of the dominant edge device in motion that is elected is about to become less than a threshold performance value based on sensing information obtained from the first edge device or the second edge device.

19. The method according to claim 18, further comprising causing the dominant edge device to trigger an alternative wireless connectivity option from the determined plurality of alternative wireless connectivity options along a predicted travel path bypassing an initial access-search at the dominant edge device when the cellular connectivity of the dominant edge device in motion is predicted to become less than the threshold performance value.

* * * * *